US011985419B2

(12) United States Patent
Hara et al.

(10) Patent No.: US 11,985,419 B2
(45) Date of Patent: *May 14, 2024

(54) DATA TRANSMISSION SYSTEMS AND DATA TRANSMISSION METHODS

(71) Applicant: Sony Group Corporation, Tokyo (JP)

(72) Inventors: Yuki Hara, Tokyo (JP); Tatsuya Ueda, Tokyo (JP); Natsumi Kaneko, Tokyo (JP)

(73) Assignee: Sony Group Corporation, Tokyo (JP)

( * ) Notice: Subject to any disclaimer, the term of this patent is extended or adjusted under 35 U.S.C. 154(b) by 38 days.

This patent is subject to a terminal disclaimer.

(21) Appl. No.: 17/523,460

(22) Filed: Nov. 10, 2021

(65) Prior Publication Data

US 2022/0078351 A1    Mar. 10, 2022

Related U.S. Application Data

(63) Continuation of application No. 16/212,207, filed on Dec. 6, 2018, now Pat. No. 11,212,432.

(Continued)

(51) Int. Cl.
| | |
|---|---|
| *H04N 23/61* | (2023.01) |
| *H04N 5/04* | (2006.01) |
| *H04N 23/62* | (2023.01) |
| *H04N 23/661* | (2023.01) |
| *H04N 23/90* | (2023.01) |

(Continued)

(52) U.S. Cl.
CPC ............. *H04N 23/662* (2023.01); *H04N 5/04* (2013.01); *H04N 23/62* (2023.01); *H04N 23/661* (2023.01); *H04N 23/90* (2023.01); *G06F 3/0482* (2013.01); *H04L 67/01* (2022.05)

(58) Field of Classification Search
CPC ........ H04N 23/662; H04N 5/04; H04N 23/62; H04N 23/661; H04N 23/90; G06F 3/0482; G06F 1/189; G06F 1/24; H04L 67/01; H04L 69/28
See application file for complete search history.

(56) References Cited

U.S. PATENT DOCUMENTS

| | | | |
|---|---|---|---|
| 2002/0075244 A1* | 6/2002 | Tani ...................... | G06F 3/0481 700/83 |
| 2002/0118286 A1 | 8/2002 | Kanada et al. | |

(Continued)

*Primary Examiner* — Sinh Tran
*Assistant Examiner* — Zhenzhen Wu
(74) *Attorney, Agent, or Firm* — Michael Best & Friedrich LLP

(57) ABSTRACT

Data transmission systems and methods. In one embodiment, a data transmission system includes a plurality of imaging devices, a plurality of control devices, and an information processing device. One of the plurality of control devices operates as a master control device and a remainder of the plurality of control devices operate as client control devices. The information processing device is configured to transmit an acquisition request for one or more images captured by a first imaging device of the plurality of imaging devices to the master control device. The master control device is configured to transfer the acquisition request to one of the client control devices that controls the first imaging device. In response to receiving the acquisition request, the one of the client control devices is configured to transfer a list of images captured by the first imaging device to the information processing device.

19 Claims, 21 Drawing Sheets

Related U.S. Application Data

(60) Provisional application No. 62/613,587, filed on Jan. 4, 2018.

(51) Int. Cl.
  *G06F 3/0482* (2013.01)
  *H04L 67/01* (2022.01)

(56) References Cited

U.S. PATENT DOCUMENTS

| | | | |
|---|---|---|---|
| 2004/0183915 | A1 | 9/2004 | Gotohda et al. |
| 2006/0165405 | A1 | 7/2006 | Kanai et al. |
| 2011/0181729 | A1* | 7/2011 | Lee .................. H04N 7/181 348/E7.085 |
| 2013/0147686 | A1* | 6/2013 | Clavin ............... G02B 27/017 345/8 |
| 2016/0191752 | A1 | 6/2016 | Takitsune et al. |
| 2016/0191815 | A1* | 6/2016 | Annau .................. G06T 19/006 348/38 |
| 2017/0111413 | A1 | 4/2017 | Nowak |
| 2017/0295309 | A1 | 10/2017 | Cabral |
| 2019/0149702 | A1 | 5/2019 | Satoh et al. |
| 2019/0306434 | A1* | 10/2019 | Annau .................. H04N 23/698 |
| 2019/0372746 | A1* | 12/2019 | Tamura ............... H04W 72/569 |
| 2020/0044760 | A1 | 2/2020 | Seed et al. |
| 2022/0304084 | A1* | 9/2022 | Ahmed ................ H04W 72/20 |

* cited by examiner

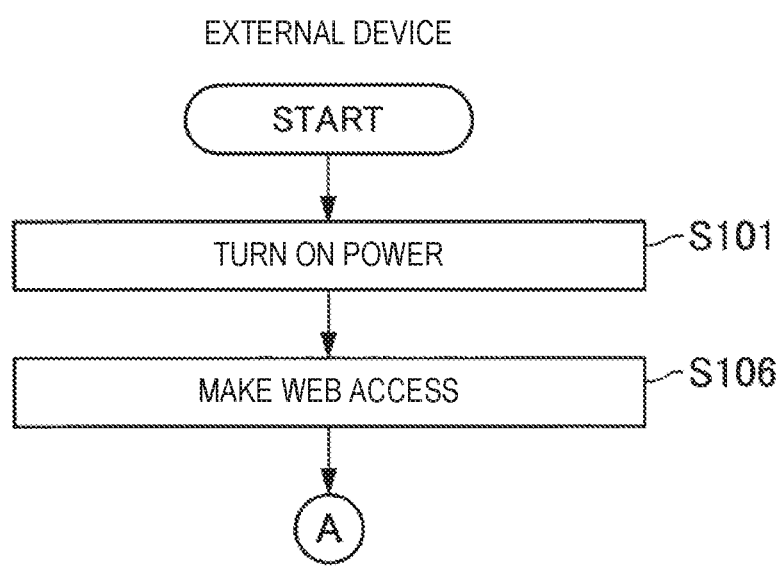

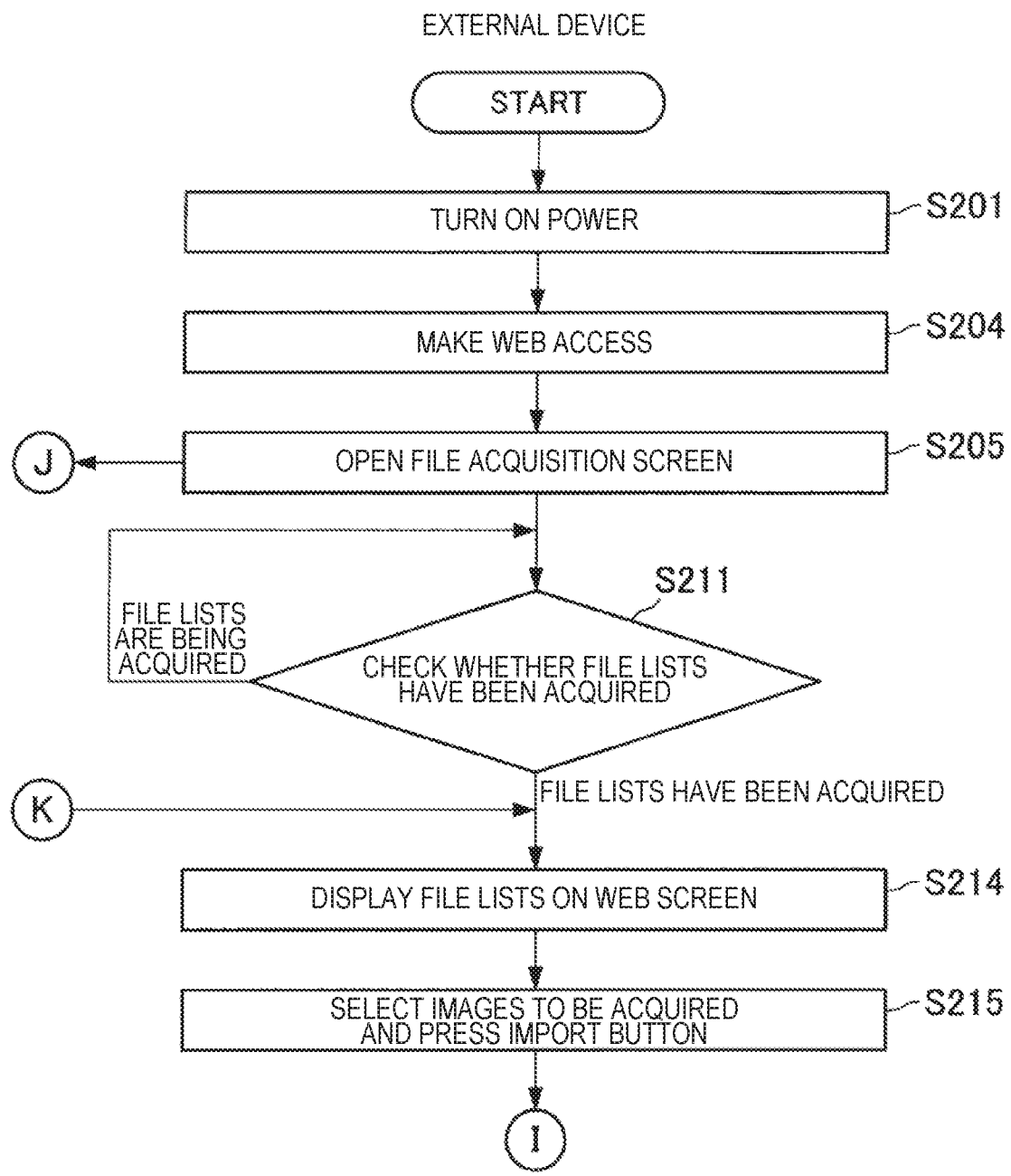

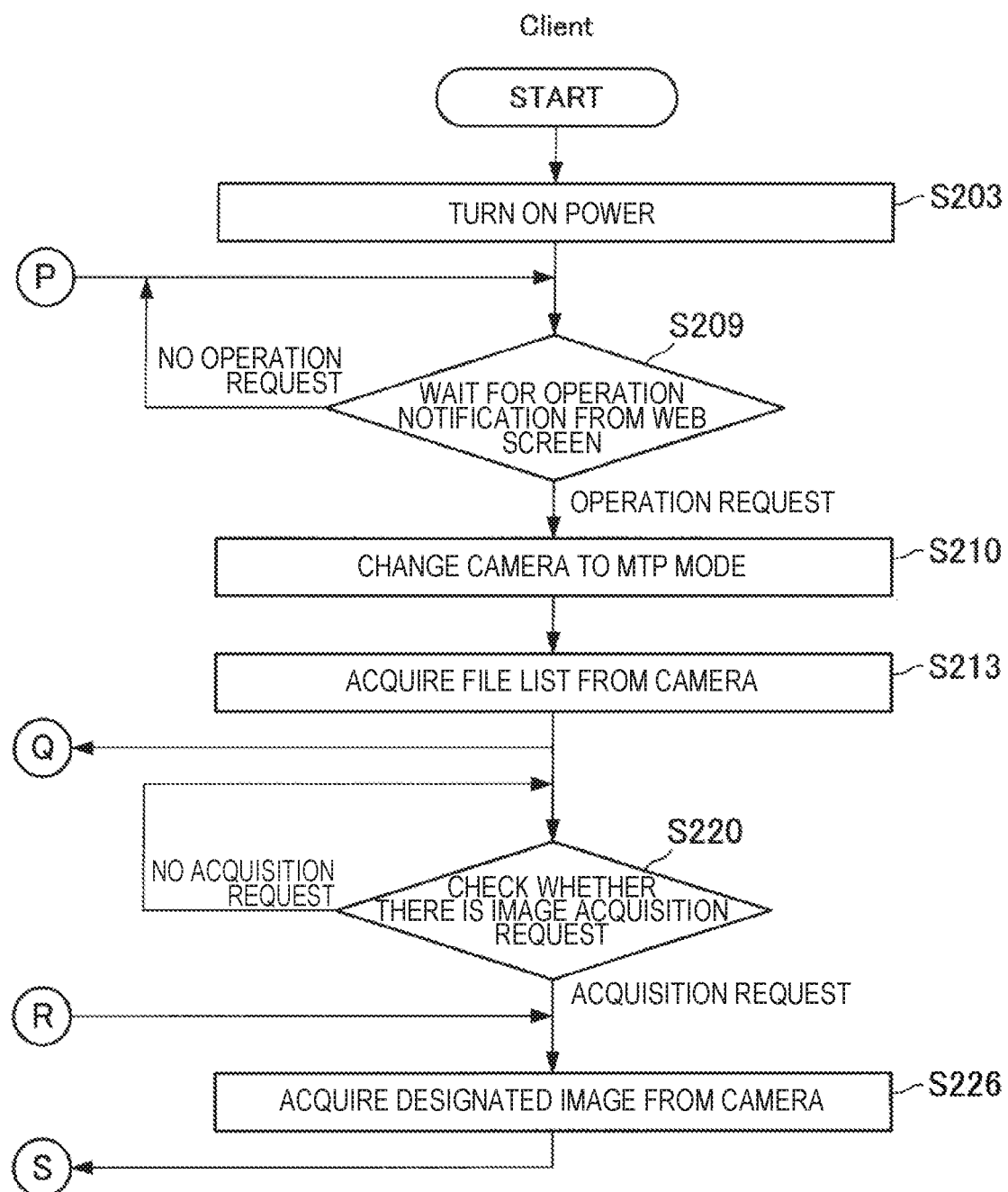

DATA TRANSMISSION SYSTEMS AND DATA TRANSMISSION METHODS

CROSS REFERENCE TO RELATED APPLICATIONS

This application is a continuation of U.S. application Ser. No. 16/212,207, filed Dec. 6, 2018, which claims priority to, and the benefit of, U.S. Provisional Patent Application 62/613,587, filed Jan. 4, 2018, the entire contents of which are incorporated herein by reference.

FIELD OF INVENTION

The present disclosure relates to data transmission systems and data transmission methods.

BACKGROUND

Point of View (POV) cameras are digital cameras that are typically small in size and capture scenes from a viewpoint of an actual person. POV cameras may also be referred to as Action cameras. In related art, POV cameras have small image sensors, limited network capabilities, and deliver low quality images because of their small image sensors and limited network functions.

SUMMARY

The present disclosure proposes data transmission systems, methods, and programs that control and operate a plurality of cameras (for example, a plurality of POV cameras) that deliver images, by using an external device. In particular, the data transmission system of an embodiment of the present disclosure includes a plurality of cameras and a plurality of camera control boxes, each camera control box corresponding to one of the plurality of cameras.

The data transmission system delivers image quality and special effects (for example, bullet-time, virtual reality content, etc.) that exceed the image quality and special effects of the individual cameras by synchronizing a plurality of cameras together with a plurality of camera control devices that perform synchronized image capture.

In addition, the present disclosure proposes a data transmission system and a data transmission method that transfer images captured in the data transmission system to an external device on the basis of an instruction from the external device.

According to an embodiment of the present disclosure, there is provided a data transmission system including: a plurality of imaging devices; a plurality of control devices, each control device of the plurality of control devices is configured to control one of the plurality of imaging devices; and an information processing device configured to communicate with the plurality of control devices. One of the plurality of control devices operates as a master control device and a remainder of the plurality of control devices operate as client control devices. The information processing device is configured to transmit an acquisition request for one or more images captured by a first imaging device of the plurality of imaging devices to the master control device. The master control device is configured to transfer the acquisition request to one of the client control devices that controls the first imaging device. In response to receiving the acquisition request, the one of the client control devices is configured to transfer a list of images captured by the first imaging device to the information processing device.

In addition, according to an embodiment of the present disclosure, there is provided a data transmission method. The data transmission method includes transmitting, with an information processing device, an acquisition request for one or more images captured by a first imaging device of a plurality of imaging devices to a master control device of a plurality of control devices, a remainder of the plurality of control devices operating as client control devices. The data transmission method includes transferring, with the master control device, the acquisition request to one of the client control devices that controls the first imaging device. The data transmission method also includes transferring, with the one of the client control devices, a list of images captured by the first imaging device to the information processing device.

In addition, according to an embodiment of the present disclosure, there is provided a data transmission system including: a plurality of imaging devices; a plurality of control devices, each control device of the plurality of control devices is configured to control one of the plurality of imaging devices; and an information processing device configured to communicate with the plurality of control devices. One of the plurality of control devices operates as a master control device and a remainder of the plurality of control devices operate as client control devices. The information processing device is configured to start communication with the master control device. The master control device is configured to synchronize time with the information processing device, and control the client control devices to perform time synchronization based on the time that is synchronized between the master control device and the information processing device. The each control device of the plurality of control devices is configured to perform frame and time synchronization with respective ones of the plurality of imaging devices when the time synchronization is completed between the master control device and the client control devices.

In addition, according to an embodiment of the present disclosure, there is provided a data transmission method. The data transmission method includes starting, with an information processing device, communication with a master control device of a plurality of control devices, wherein a remainder of the plurality of control devices operate as client control devices. The data transmission method includes synchronizing, with the master control device, time with the information processing device. The data transmission includes controlling, with the master control device, the client control devices to perform time synchronization based on the time that is synchronized between the master control device and the information processing device. The data transmission also includes performing, with each control device of the plurality of control devices, frame and time synchronization with respective ones of a plurality of imaging devices when the time synchronization is completed between the master control device and the client control devices.

According to embodiments of the present disclosure as described above, data transmission systems and data transmission methods that control and operate a plurality of cameras (for example, a plurality of POV cameras) that deliver images, by using an external device can be provided.

Note that the effects described above are not necessarily limitative. With or in the place of the above effects, there may be achieved any one of the effects described in this specification or other effects that may be grasped from this specification.

BRIEF DESCRIPTION OF THE DRAWINGS

FIG. 4A is a flowchart illustrating an operation example of a multi-camera system according to the embodiment;

FIG. 5 is an explanatory diagram illustrating an example of a graphical user interface displayed on a screen of an external device;

FIG. 6 is an explanatory diagram illustrating an example of a graphical user interface displayed on a screen of an external device;

FIG. 7A is a flowchart illustrating an operation example of a multi-camera system according to the embodiment;

FIG. 7D is a flowchart illustrating an operation example of a multi-camera system according to the embodiment;

FIG. 8 is an explanatory diagram illustrating an example of a graphical user interface displayed on a screen of an external device;

FIG. 10 is an explanatory diagram illustrating an example of a graphical user interface displayed on a screen of an external device;

FIG. 11 is an explanatory diagram illustrating an example of a graphical user interface displayed on a screen of an external device.

DETAILED DESCRIPTION OF THE EMBODIMENT(S)

Figure 1:
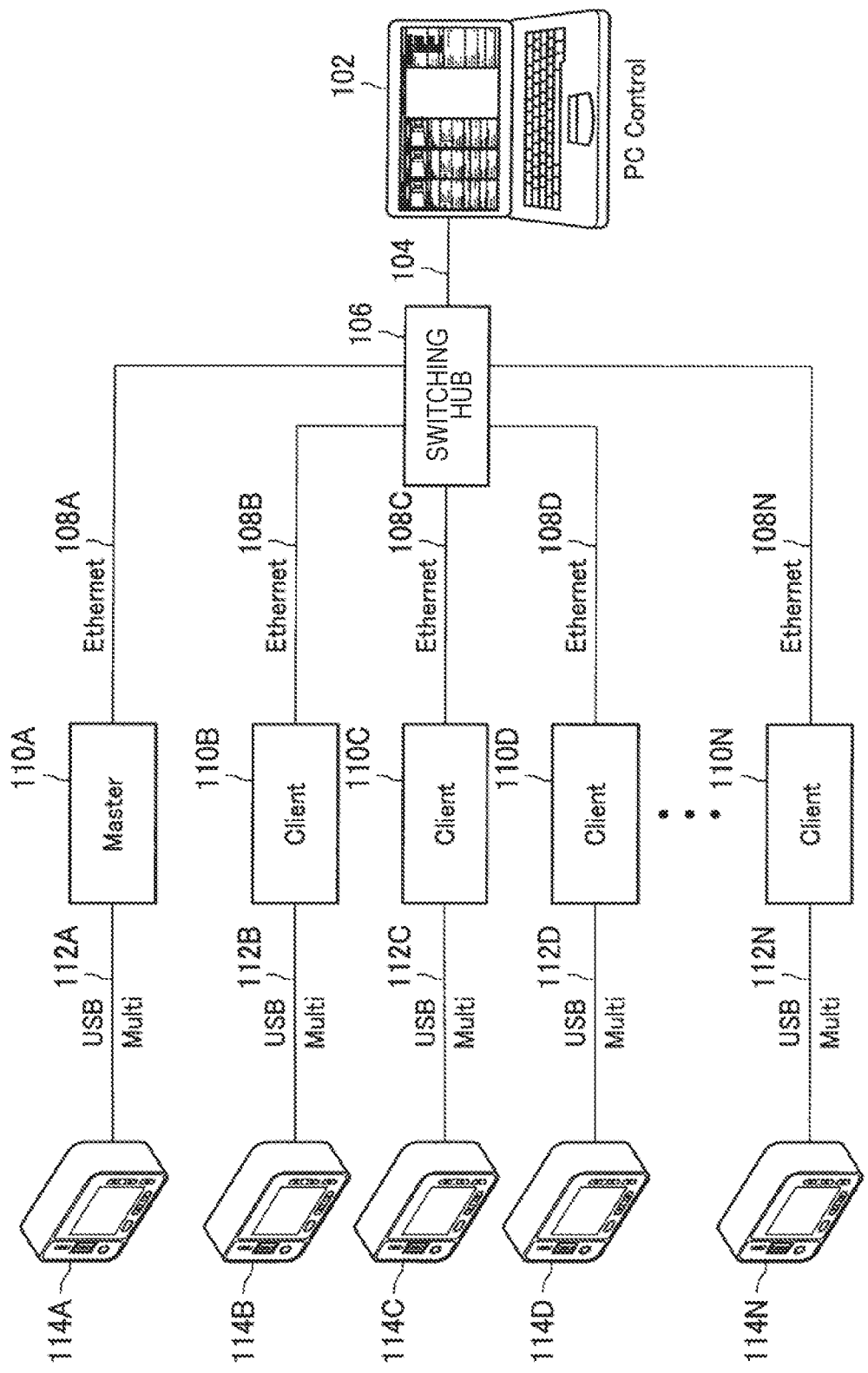
FIG. 1 is an explanatory diagram illustrating a schematic configuration of a multi-camera system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. Embodiment of present disclosure
1.1. System configuration example
1.2. Device configuration example
1.3. Operation example
2. Conclusion

1. Embodiment of Present Disclosure

[1.1. System Configuration Example]

First, a schematic configuration of a multi-camera system according to an embodiment of the present disclosure, which is an example of the data transmission system of an embodiment of the present disclosure, is described with reference to FIG. 1.

The multi-camera system according to the embodiment of the present disclosure includes a plurality of cameras communicatively connected to an external device (for example, a personal computer) via a plurality of camera control devices. The plurality of cameras and the plurality of camera control devices have a one-to-one correspondence. That is, one camera control device is provided for one camera.

Each camera control device controls conversion between a control signal and an Internet Protocol (IP) signal. By interfacing a plurality of cameras with a plurality of camera control devices, the plurality of cameras can be controlled from a single external device. Further, by interfacing a plurality of cameras with a plurality of camera control devices, the multi-camera system synchronizes timecodes and frame timings between each camera of the plurality of cameras. By synchronizing timecodes and frame timings, the multi-camera system generates special effects that are not possible without synchronization (for example, bullet-time, Virtual Reality (VR), three-dimensional (3D) shooting, or other suitable special effects). Furthermore, by interfacing a plurality of cameras with a plurality of camera control devices, the multi-camera system provides a method of transferring live view, images, videos, and other suitable data from each of the plurality of cameras to the external device.

FIG. 1 is an explanatory diagram illustrating a configuration example of a multi-camera system 100 according to the embodiment of the present disclosure. As illustrated in FIG. 1, the multi-camera system 100 according to the embodiment of the present disclosure includes an external device 102, a switching hub 106, a plurality of camera control devices 110A to 110N, and a plurality of cameras 114A to 114N. The external device 102 and the switching hub 106 are connected by an Ethernet (registered trademark) connection 104. The switching hub 106 and the plurality of camera control devices 110A to 110N are connected respectively by a plurality of Ethernet (registered trademark) connections 108A to 108N. The plurality of camera control devices 110A to 110N and the plurality of cameras 114A to 114N are connected respectively by a plurality of USB multi-interface cables 112A to 112N.

The external device 102, which is an example of an information processing device of an embodiment of the present disclosure, includes an electronic processor, a memory, and an input/output (I/O) interface (not shown). The external device 102 may be a desktop or notebook personal computer including such devices, for example. The electronic processor, the memory, and the input/output interface communicate via one or more communication buses (not shown). The external device 102 can include additional or different components and may be configured to perform additional functionality than the functionality described herein.

The memory of the external device 102 can include a program storage area (e.g., read only memory (ROM)) and a data storage area (e.g., random access memory (RAM), and other non-transitory, computer-readable medium). For example, the data storage area of the memory can store information (for example, a lookup table or other suitable format) regarding images that will be generated and retrieved as part of the multi-camera system 100.

The electronic processor of the external device 102 (e.g., a microprocessor or other suitable processing device) is coupled to the memory and executes machine-readable instructions stored in the memory. For example, instructions stored in the memory, when executed by the electronic processor, can cause the external device 102 to communicate with and/or control the plurality of camera control devices 110A to 110N as described herein. Additionally, instructions stored in the memory of the external device 102, when executed by the electronic processor of the external device 102, can cause the external device 102 to perform the various operations as described herein.

Each camera control device of the plurality of camera control devices 110A to 110N includes an electronic processor, a memory, and an input/output (I/O) interface that is similar to the electronic processor, the memory, the I/O interface, and one or more communication buses, as described above with respect to the external device 102.

One of the plurality of camera control devices 110A to 110N serves as a master camera control device. Assume that the master camera control device is the camera control device 110A. The rest of the camera control devices serve as client camera control devices.

For example, instructions stored in the memory of the master camera control device 110A, when executed by the electronic processor of the master camera control device 110A, cause communication and/or control to be performed between the master camera control device 110A and the client camera control devices 110B to 110N.

Additionally, instructions stored in the memory of the client camera control devices 110B to 110N, when executed by the electronic processor of the respective client camera control devices 110B to 110N, can cause the client camera control devices 110B to 110N to perform various camera control operations.

Each camera of the plurality of cameras 114A to 114N includes an electronic processor, a memory, and an input/output (I/O) interface that is similar to the electronic processor, the memory, the I/O interface, and one or more communication buses, as described above with respect to the external device 102 and the plurality of camera control devices 110A to 110N.

For example, instructions stored in the memory of the plurality of cameras 114A to 114N, when executed by the electronic processor of the respective cameras 114A to 114N, can cause the plurality of cameras 114A to 114N to perform the various camera operations as described herein.

As illustrated in FIG. 1, the external device 102 is communicatively connected to the switching hub 106 via the Ethernet (registered trademark) connection 104. In other examples, connection between the external device 102 and the switching hub 106 may be a wireless communication connection.

The switching hub 106 is communicatively connected to the plurality of camera control devices 110A to 110N via the plurality of Ethernet (registered trademark) connections 108A to 108N (for example, Ethernet (registered trademark) communication with local area network (LAN) cables). The external device 102 and each of the plurality of camera control devices 110A to 110N may be assigned a specific internet protocol (IP) address by the switching hub 106. The external device 102 and the plurality of camera control devices 110A to 110N may communicate with each other using IP signals. The plurality of camera control devices 110A to 110N are communicatively connected to the plurality of cameras 114A to 114N via the plurality of USB multi-interface cables 112A to 112N.

The plurality of camera control devices 110A to 110N includes a master camera control device 110A with an embedded server. In some examples, the master camera control device 110A is the first of the plurality of camera control devices 110A to 110N to be communicatively connected to the external device 102 via the switching hub 106. In other examples, the "master" status is designated by the external device 102 to any one of the plurality of camera control devices 110A to 110N. For example, the external device 102 can change the "master" status of camera control device 110A to "client" and set the camera control device 110B as having the "master" status. Additionally or alternatively, in some examples, each of the plurality of camera control devices includes a toggle switch or other suitable switch, and in some examples, the designation of "master" status may be based on a user input received at the external device 102. In each of the plurality of camera control devices, the "master" status may be designated on the basis of a position of the toggle switch or other suitable switch.

The external device 102 accesses the master camera control device 110A via the embedded server. The master camera control device 110A receives instructions from the external device 102 and transmits data to the external device 102. The master camera control device 110A also transmits instructions to the other camera control devices 110B to 110N (also referred to as "client devices") as IP signals via the switching hub 106 and receives data from the client devices as IP signals. In some examples, the master camera control device 110A sets up synchronized shooting of the plurality of cameras 114A to 114N. In other examples, the master camera control device 110A performs file transfers from the plurality of cameras 114A to 114N to the external device 102 on the basis of user input at the external device 102.

The external device 102 includes a web browser that accesses the embedded server of the master camera control device 110A and provides the user with a graphical user interface to control the plurality of cameras 114A to 114N via the plurality of camera control devices 110A to 110N.

Each camera of the plurality of cameras 114A to 114N is individually connected to a corresponding one of the plurality of camera control devices 110A to 110N via a USB Multi-interface cable (also referred to as UM cable). Each camera control device of the plurality of camera control devices 110A to 110N transmits control signals to the corresponding camera of the plurality of cameras 114A to 114N via the UM cable. In some examples, the controls signal may include a power ON/OFF signal, an image capture signal, an update system information signal, and a change camera setting signal (for example, change image resolution, change frame rate, change ISO settings, or change other suitable camera setting). In some examples, each camera of the plurality of cameras 114A to 114N transmits data to the corresponding one of the plurality of camera control devices 110A to 110N via the UM cable. For example, the data can include live view image data, files, file path directory information, and other suitable data. Additionally, in some examples, each camera of the plurality of cameras 114A to 114N receives power via the UM cable.

Figure 2:
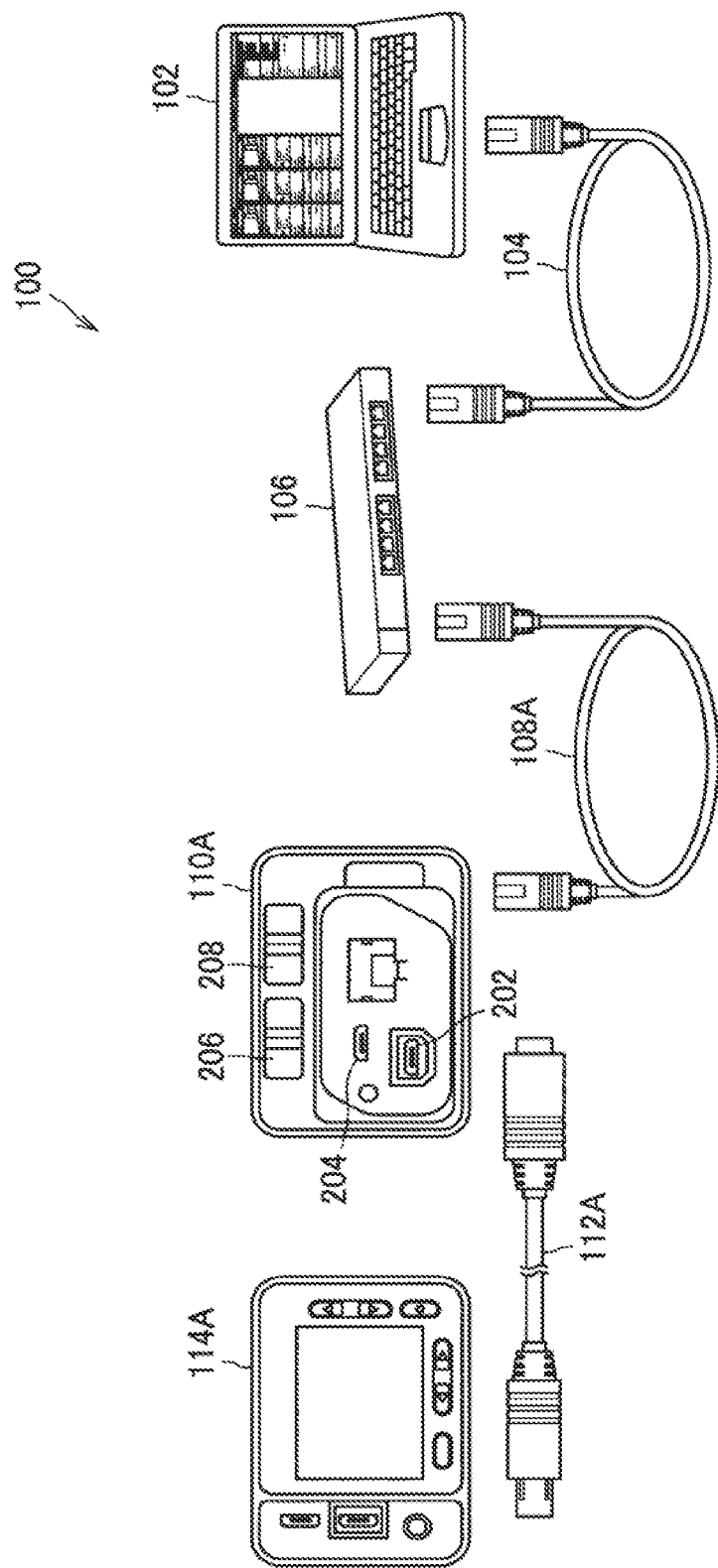
FIG. 2 is an explanatory diagram illustrating details of devices constituting a multi-camera system.

The configuration example of the multi-camera system 100 according to the embodiment of the present disclosure has been described using FIG. 1. Now, details of devices constituting the multi-camera system 100 will be described using FIG. 2. FIG. 2 illustrates details of devices constituting the multi-camera system 100 of FIG. 1. FIG. 2 illustrates the external device 102, the Ethernet (registered trademark) connection 104, the switching hub 106, the Ethernet (registered trademark) connection 108A, the camera control device 110A, the USB multi-interface cable 112A, and the camera 114A.

In the example of FIG. 2, the USB multi-interface cable 112A is a male-type UM-UM cable that connects the camera 114A to the camera control device 110A at a port 202. In some examples, a micro USB charging cable (not shown) is connected to the camera control device 110A at a port 204 for receiving power from a power source. In the example of FIG. 2, the Ethernet (registered trademark) connection 108A is a LAN cable connected between the camera control device 110A and the switching hub 106. Similarly, the Ethernet (registered trademark) connection 104 is another LAN cable connected between the switching hub 106 and the external device 102 (for example, a personal computer). In some examples, the camera control device 110A can also include indicators (for example, LED indicators) to indicate a power supply connection and/or connection status with the camera 114A. Additionally, the camera control device 110A can include a Master-Client switch 206 for designating the camera control device 110A as the master camera control device 110A for the multi-camera system 100. In some examples, the camera control device 110A can also include a power switch 208.

In the multi-camera system 100, only one camera control device operates as a master, and other camera control devices operate as clients. Therefore, only one camera control device has the Master-Client switch 206 switched to the master side. Here, in the case where two or more camera control devices have the Master-Client switch 206 switched to the master side, one camera control device may be recognized as a master, and indicators of the other camera control devices (with the Master-Client switch 206 switched to the master side) may be lit. In the case where no camera control device has the Master-Client switch 206 switched to the master side, indicators of all the camera control devices may be blinked.

As illustrated in FIG. 2, the camera control device 110A may have a size that is similar to a size of the camera 114A (for example, a size that is similar to a POV camera). However, in other examples, a size of the camera 114A is different than the size of the camera control device 110A in some cases (for example, a case where the camera 114A is a professional cinema camera, a studio camera, a surveillance camera, or other suitable camera).

The details of the devices constituting the multi-camera system 100 have been described using FIG. 2. Now, a functional configuration example of a camera control device according to the embodiment of the present disclosure will be described.

[1.2. Device Configuration Example]

Figure 3:
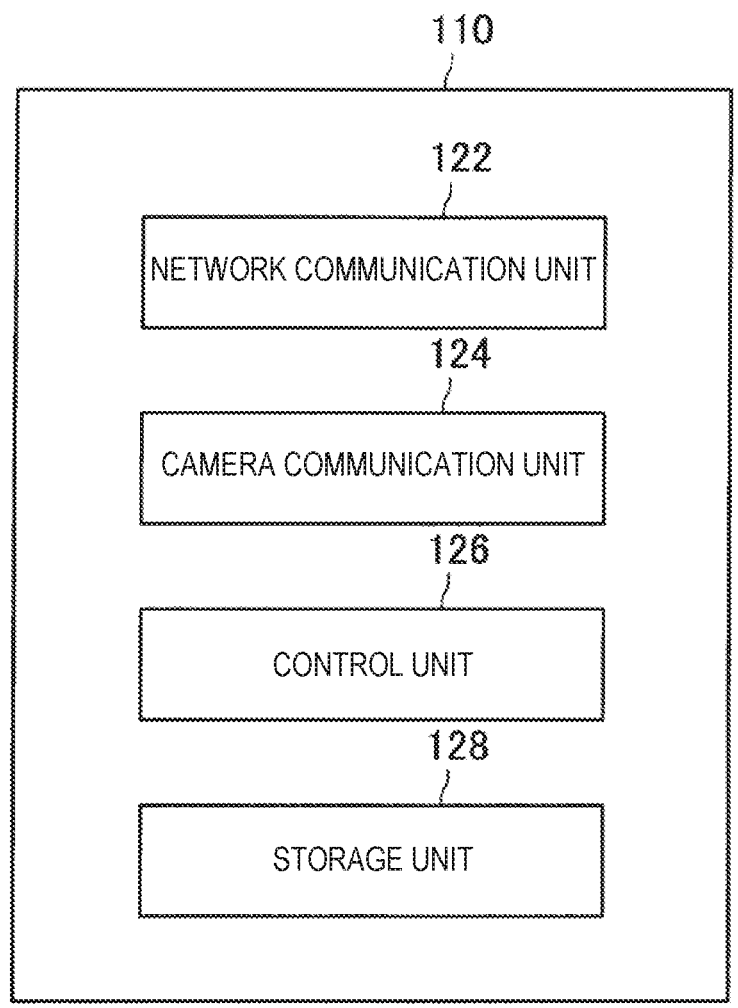
FIG. 3 is an explanatory diagram illustrating a functional configuration example of a camera control device according to the embodiment.
Figure 4B:
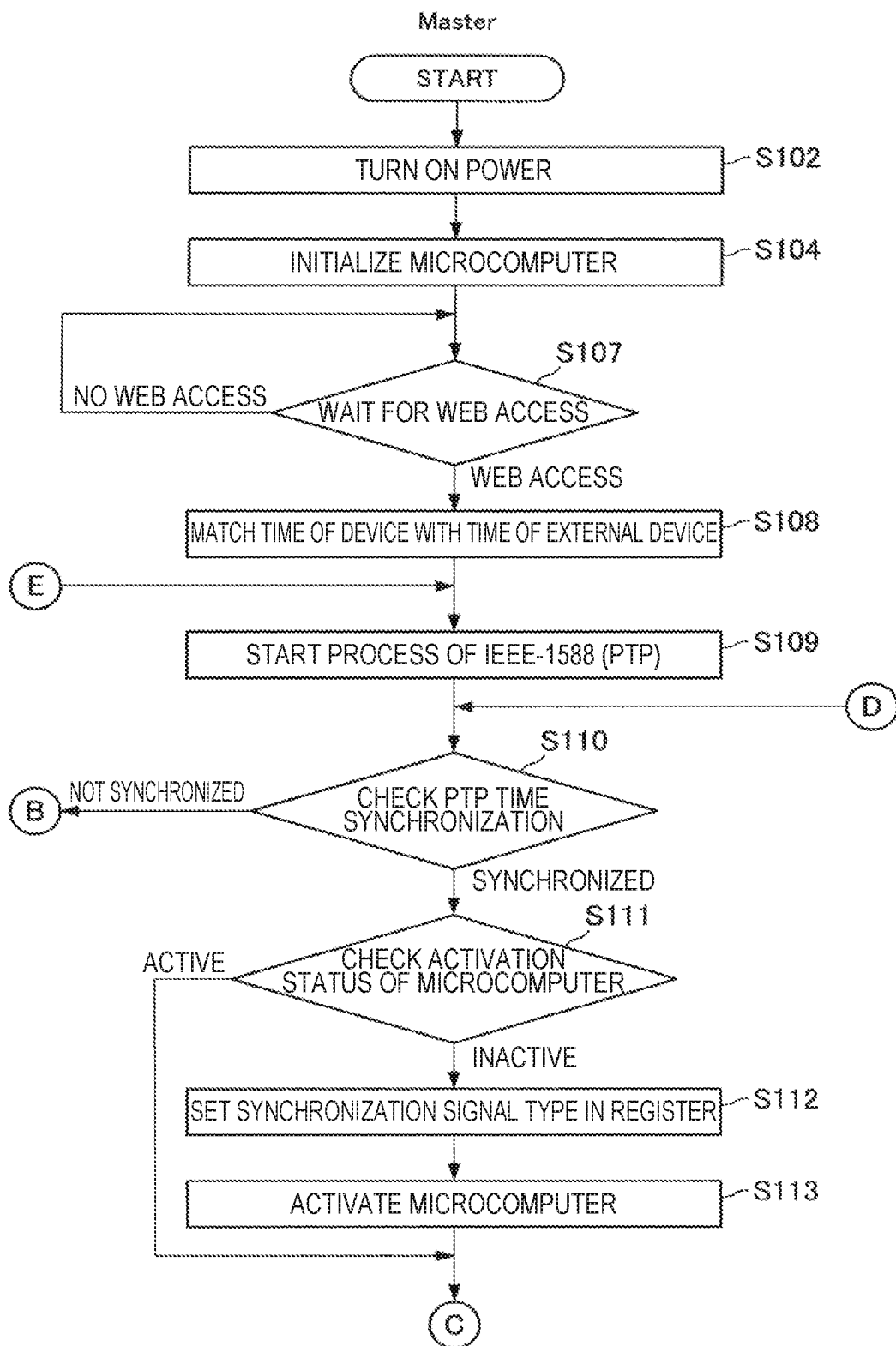
FIG. 4B is a flowchart illustrating an operation example of a multi-camera system according to the embodiment.
Figure 4C:
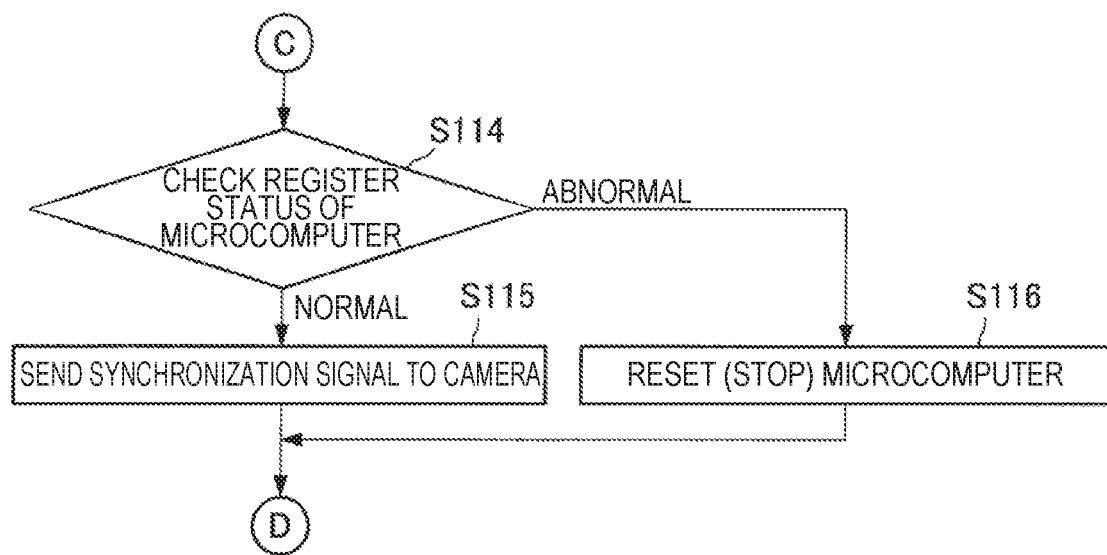
FIG. 4C is a flowchart illustrating an operation example of a multi-camera system according to the embodiment.
Figure 4D:
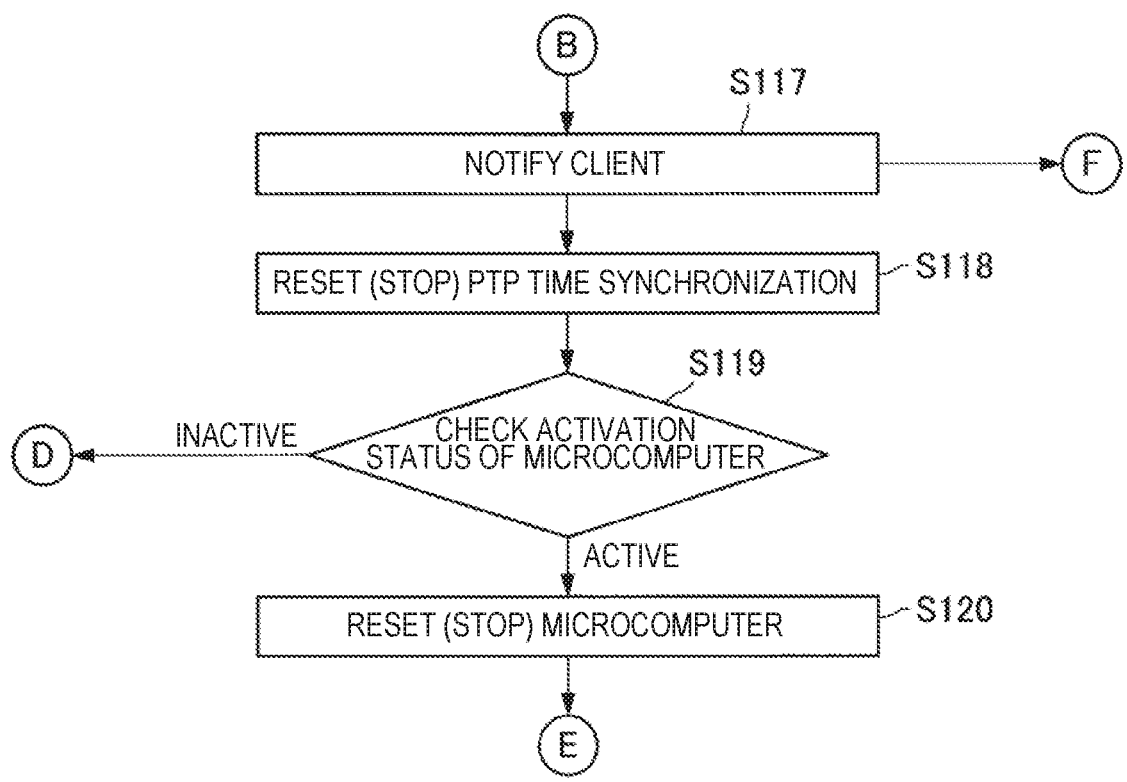
FIG. 4D is a flowchart illustrating an operation example of a multi-camera system according to the embodiment.
Figure 4E:
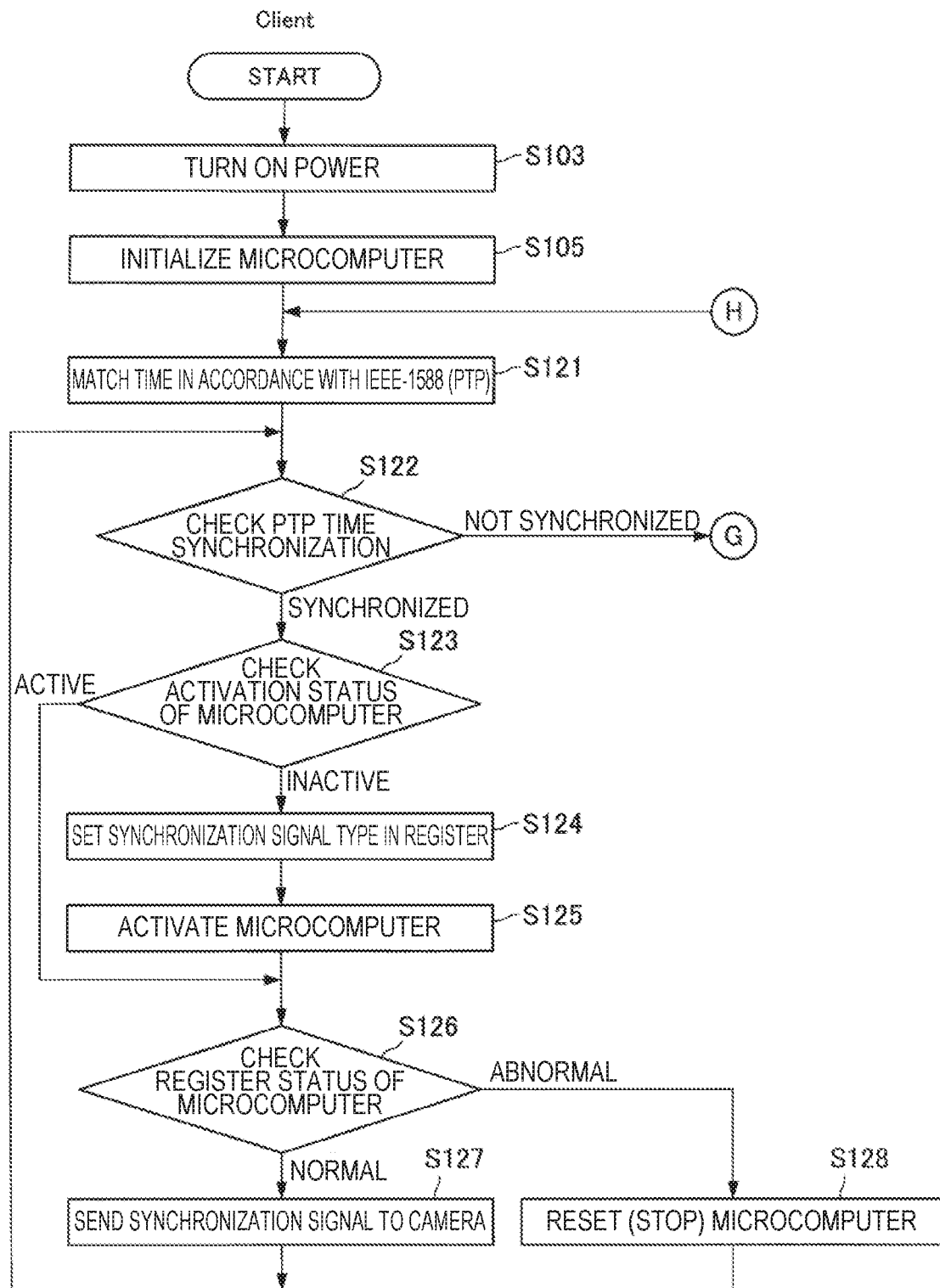
FIG. 4E is a flowchart illustrating an operation example of a multi-camera system according to the embodiment.
Figure 4F:
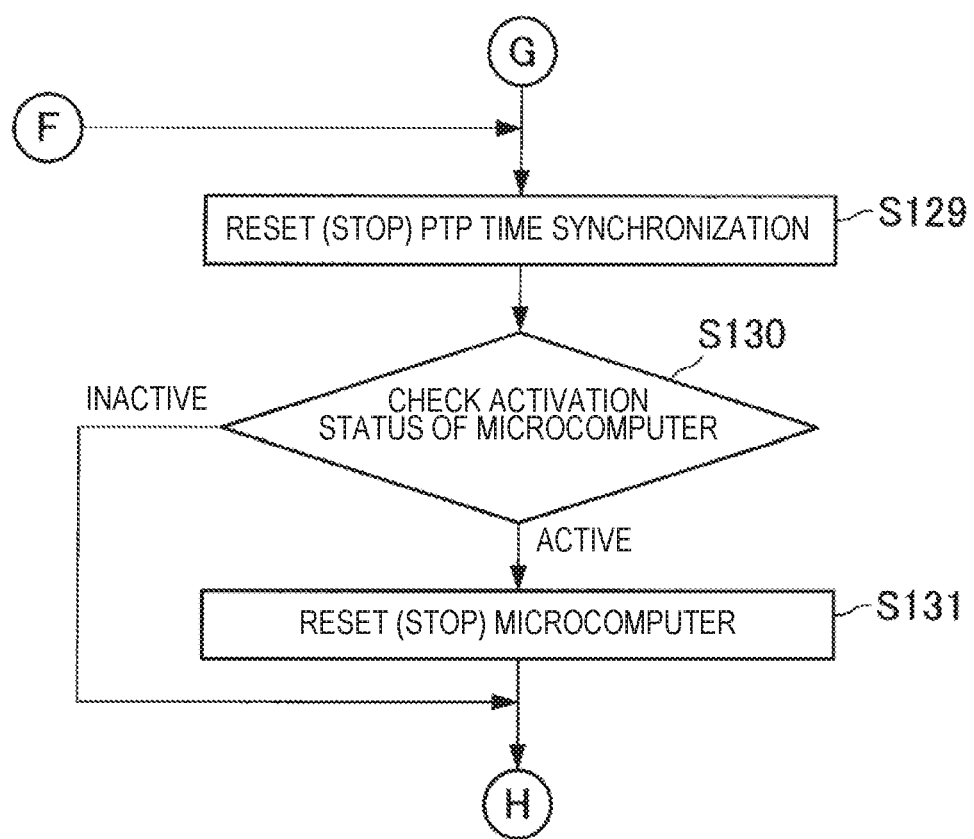
FIG. 4F is a flowchart illustrating an operation example of a multi-camera system according to the embodiment.
Figure 7B:
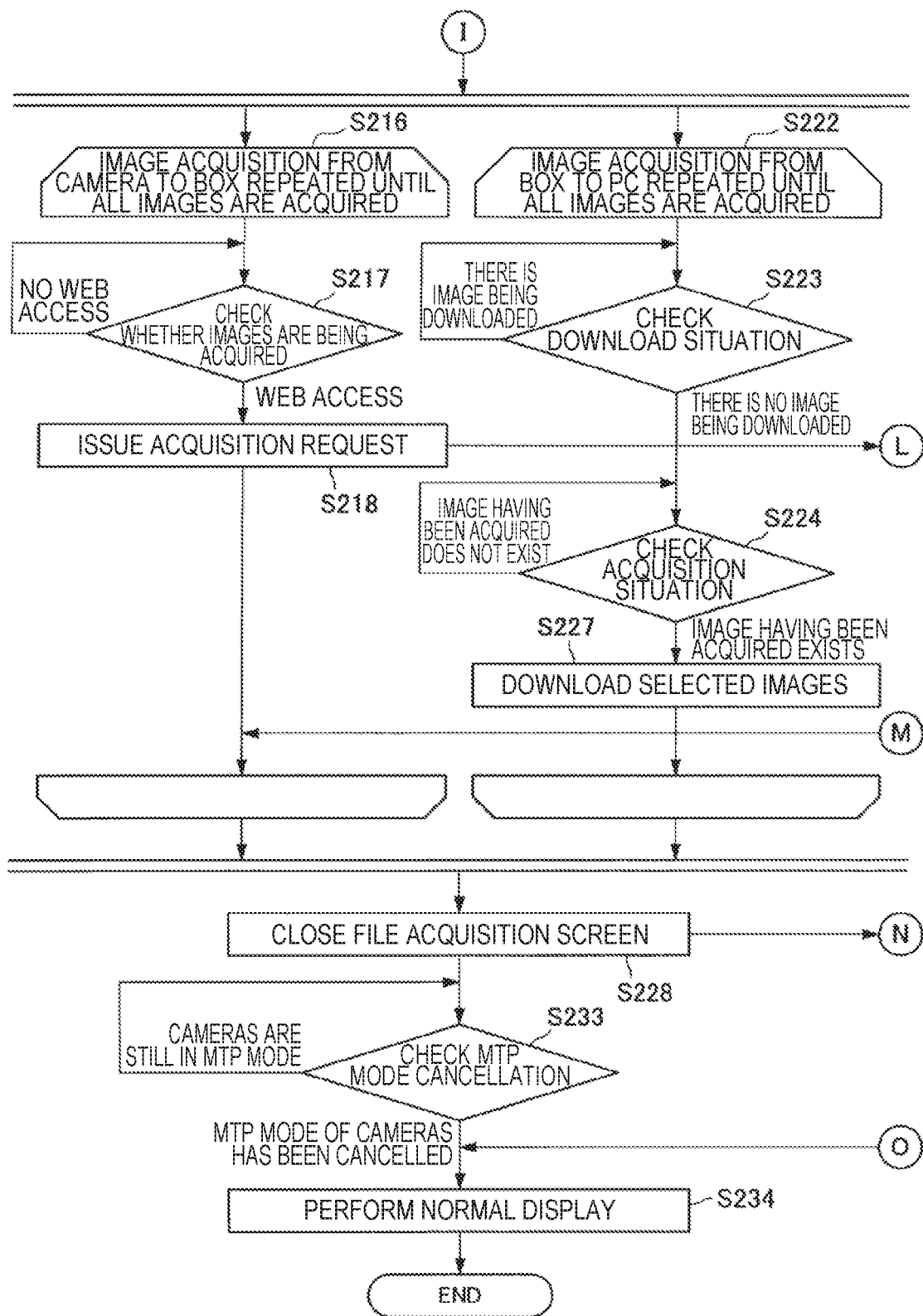
FIG. 7B is a flowchart illustrating an operation example of a multi-camera system according to the embodiment.
Figure 7C:
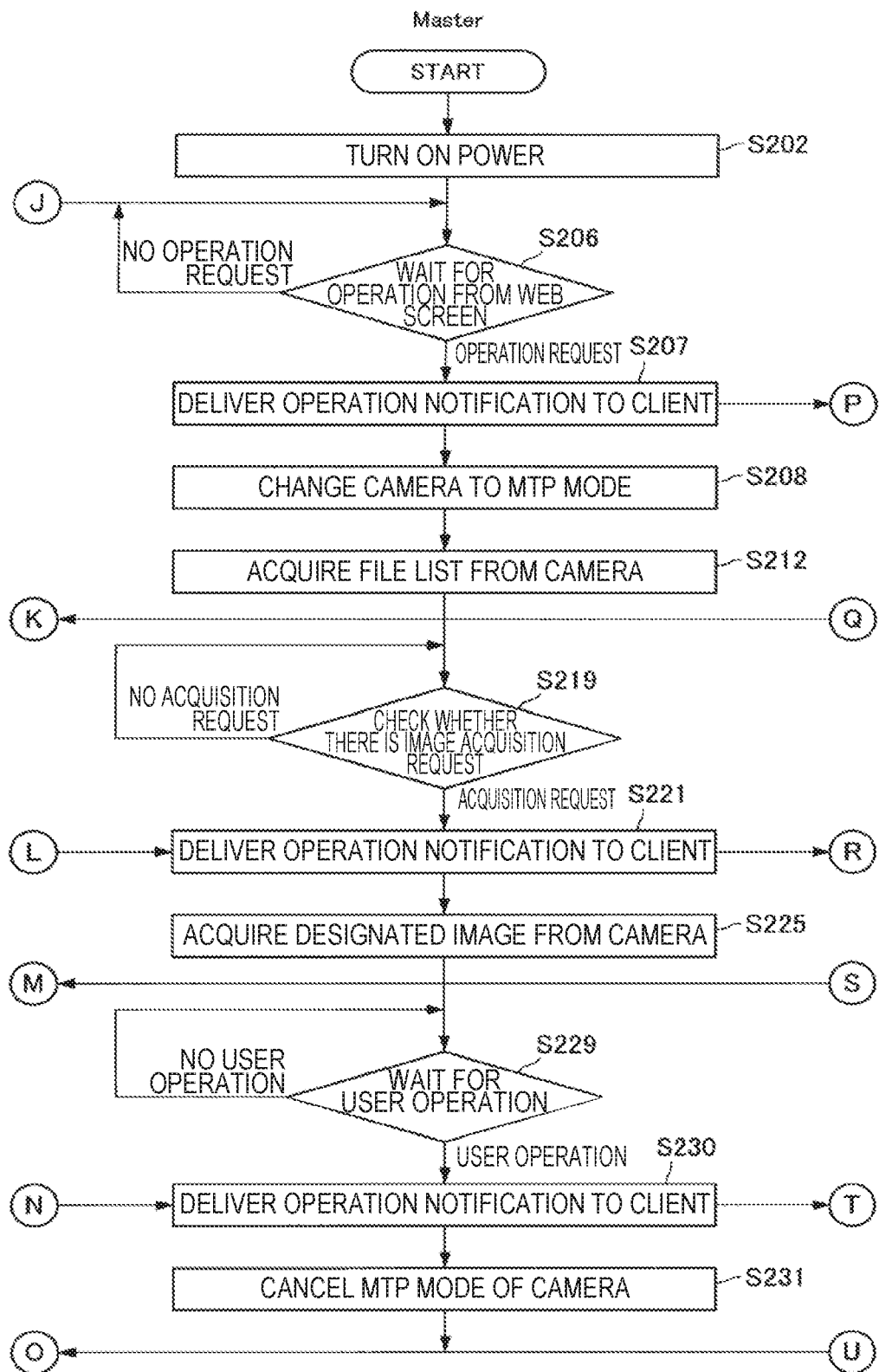
FIG. 7C is a flowchart illustrating an operation example of a multi-camera system according to the embodiment.
Figure 7E:
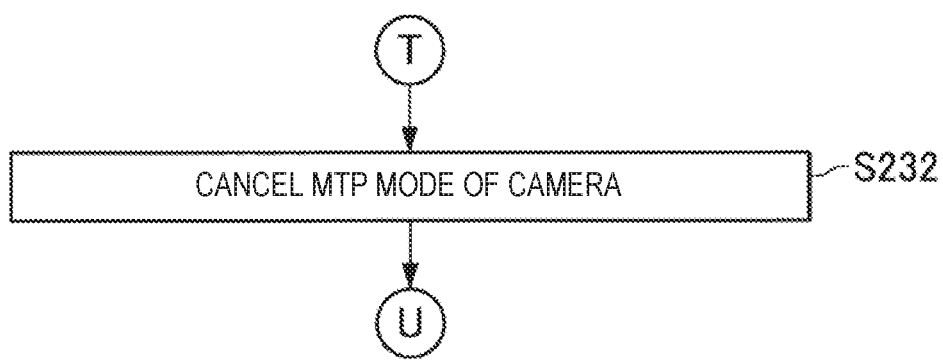
FIG. 7E is a flowchart illustrating an operation example of a multi-camera system according to the embodiment.

FIG. 3 is an explanatory diagram illustrating a functional configuration example of a camera control device according to the embodiment of the present disclosure. Hereinafter, the functional configuration example of the camera control device according to the embodiment of the present disclosure will be described using FIG. 3. In FIG. 3, the camera control devices 110A to 110N are collectively referred to and described as camera control devices 110. In addition, the cameras 114A to 114N are collectively referred to and described as cameras 114.

As illustrated in FIG. 3, the camera control device 110 according to the embodiment of the present disclosure includes a network communication unit 122, a camera communication unit 124, a control unit 126, and a storage unit 128.

The network communication unit 122 performs communication with the switching hub 106 under the control of the control unit 126. Communication between the camera control device 110 and the switching hub 106 is, for example, Ethernet communication.

The camera communication unit 124 performs communication with the camera 114 under the control of the control unit 126. Communication between the camera control device 110 and the camera 114 is, for example, communication using a USB multi-interface cable.

The control unit 126 controls operations of the camera control device 110. The control unit 126 may be, for example, a CPU or other processor. The storage unit 128 stores a program to be executed by the control unit 126, settings of a table and parameters to be referred to by the control unit 126, data acquired from the camera 114, etc.

In the case where the own device is a master camera control device, the control unit 126 performs a process of synchronizing time with other client camera control devices. In the case where the own device is a client camera control device, the control unit 126 performs a process of synchronizing time with a master camera control device. Details of the time synchronization process are described later.

The camera control device 110 according to the embodiment of the present disclosure has a Web server function. Therefore, the control unit 126 performs a process for operating as a Web server. Assume that IP addresses of the respective camera control devices 110 are designated when the multi-camera system 100 is constructed. Therefore, the external device 102 can access the Web server of the camera control device 110 by designating the IP address of the camera control device 110 to be accessed.

In addition, in the case where the own device is a master camera control device, the control unit 126 may acquire a file acquisition instruction from the external device 102. In that case, the control unit 126 transmits, to the external device 102, a list (file list) of images captured by the camera 114 connected to the own device. The control unit 126 also instructs a client camera control device to transmit a file list to the external device 102. On the basis of the instruction, the client camera control device transmits a file list to the external device 102.

The functional configuration example of the camera control device 110 according to the embodiment of the present disclosure has been described. Now, an operation example of the multi-camera system 100 according to the embodiment of the present disclosure will be described.

[1.3. Operation Example]

(Time Synchronization Process)

First, as an operation example of the multi-camera system 100 according to the embodiment of the present disclosure, an example of a time synchronization process between a plurality of camera control devices 110 will be described.

FIGS. 4A to 4F are flowcharts illustrating an operation example of the multi-camera system 100 according to the embodiment of the present disclosure. FIGS. 4A to 4F illustrate an example of the time synchronization process between the plurality of camera control devices 110. Hereinafter, the operation example of the multi-camera system 100 according to the embodiment of the present disclosure will be described using FIGS. 4A to 4F. The following description is given assuming that the master camera control device is the master camera control device 110A, and the client camera control device is the client camera control device 110B.

First, when the power of each of the external device 102, the master camera control device 110A, and the client camera control device 110B is turned on (steps S101, S102, S103), the master camera control device 110A and the client camera control device 110B each perform initialization of a microcomputer (steps S104, S105).

After the power is turned on, the external device 102 designates the IP address of the master camera control device 110A by using the Web browser, and accesses the Web server of the master camera control device 110A (step S106).

After completion of the initialization of the microcomputer, the master camera control device 110A waits for an access from the external device 102 to the Web server (step S107). When there is an access from the external device 102 to the Web server, the master camera control device 110A performs a process of matching a time of the own device with a time of the external device 102 (step S108).

On matching the time of the own device with the time of the external device 102, the master camera control device 110A then performs a process of time synchronization with the client camera control device 110B by using a time synchronization protocol. In the present embodiment, the master camera control device 110A performs the time synchronization process by using a time synchronization protocol IEEE-1588 (the Precision Time Protocol (PTP)) using Ethernet (registered trademark) (step S109). This time synchronization process is performed by, for example, the control unit 126. IEEE-1588 is a technology capable of accurately transferring high-precision time information from a master clock to a client clock via an asynchronous packet network.

On starting the time synchronization process, the master camera control device 110A checks time synchronization with the client camera control device 110B by the PTP (step S110). If time synchronization with the client camera control device 110B is achieved by performing the time synchronization process, the master camera control device 110A checks an activation status of the microcomputer (step S111). This check process is performed by, for example, the control unit 126. Here, the microcomputer whose activation status is checked may be a microcomputer for controlling the camera 114A.

As a result of the determination in step S111, if the microcomputer is inactive, the master camera control device 110A sets a synchronization signal type in a register (step S112), and activates the microcomputer (step S113). As a result of the determination in step S111, if the microcomputer is active, the master camera control device 110A skips the processes of steps S112 and S113.

Then, the master camera control device 110A checks a status of the register of the microcomputer (step S114). This check process is performed by, for example, the control unit 126. If the status of the register is normal, the master camera control device 110A sends a synchronization signal to the camera 114A (step S115). After sending the synchronization signal to the camera 114A, the master camera control device 110A returns to the process of checking time synchronization with the client camera control device 110B by the PTP in step S110. On the other hand, if the status of the register is abnormal, the master camera control device 110A resets (or stops) the microcomputer (step S116). After resetting (or stopping) the microcomputer, the master camera control device 110A returns to the process of checking time synchronization with the client camera control device 110B by the PTP in step S110.

If time synchronization with the client camera control device 110B is not achieved according to the check in step S110, the master camera control device 110A transmits a notification for time synchronization to the client camera control device 110B (step S117). On making the notification to the client camera control device 110B, the master camera control device 110A then stops the time synchronization process by the PTP (step S118). Then, the master camera control device 110A checks an activation status of the microcomputer (step S119). If the microcomputer is active, the master camera control device 110A resets (or stops) the microcomputer (step S120), and returns to the check process in step S110. If the microcomputer is inactive, the master camera control device 110A directly returns to the check process in step S110.

Concurrently with the processes in the master camera control device 110A described above, the client camera control device 110B performs a process of matching a time with that of the master camera control device 110A in accordance with the IEEE-1588 (PTP) (step S121).

On starting the time synchronization process, the client camera control device 110B checks time synchronization with the master camera control device 110A by the PTP (step S122). If time synchronization with the master camera control device 110A is achieved by performing the time synchronization process, the client camera control device 110B checks an activation status of the microcomputer (step S123). This check process is performed by, for example, the control unit 126. Here, the microcomputer whose activation status is checked may be a microcomputer for controlling the camera 114B.

As a result of the determination in step S123, if the microcomputer is inactive, the client camera control device 110B sets a synchronization signal type in a register (step S124), and activates the microcomputer (step S125). As a result of the determination in step S123, if the microcomputer is active, the client camera control device 110B skips the processes of steps S124 and S125.

Then, the client camera control device 110B checks a status of the register of the microcomputer (step S126). This check process is performed by, for example, the control unit 126. If the status of the register is normal, the client camera control device 110B sends a synchronization signal to the camera 114B (step S127). After sending the synchronization signal to the camera 114B, the client camera control device 110B returns to the process of checking time synchronization with the master camera control device 110A by the PTP in step S122. On the other hand, if the status of the register is abnormal, the client camera control device 110B resets (or stops) the microcomputer (step S128). After resetting (or stopping) the microcomputer, the client camera control device 110B returns to the process of checking time synchronization with the master camera control device 110A by the PTP in step S122.

If time synchronization with the master camera control device 110A is not achieved according to the check in step S122, the client camera control device 110B receives a notification transmitted from the master camera control device 110A in step S117, and stops the time synchronization process by the PTP in response to the reception of the notification (step S129). Then, the client camera control device 110B checks an activation status of the microcomputer (step S130). If the microcomputer is active, the client camera control device 110B resets (or stops) the microcomputer (step S131), and returns to the check process in step S122. If the microcomputer is inactive, the client camera control device 110B directly returns to the check process in step S122.

The master camera control device 110A and the client camera control device 110B can synchronize time by performing the series of operations described above. The master camera control device 110A and the client camera control device 110B can reduce a difference in time between images captured by the cameras 114A and 114B by synchronizing the time in this manner.

Figure 5:
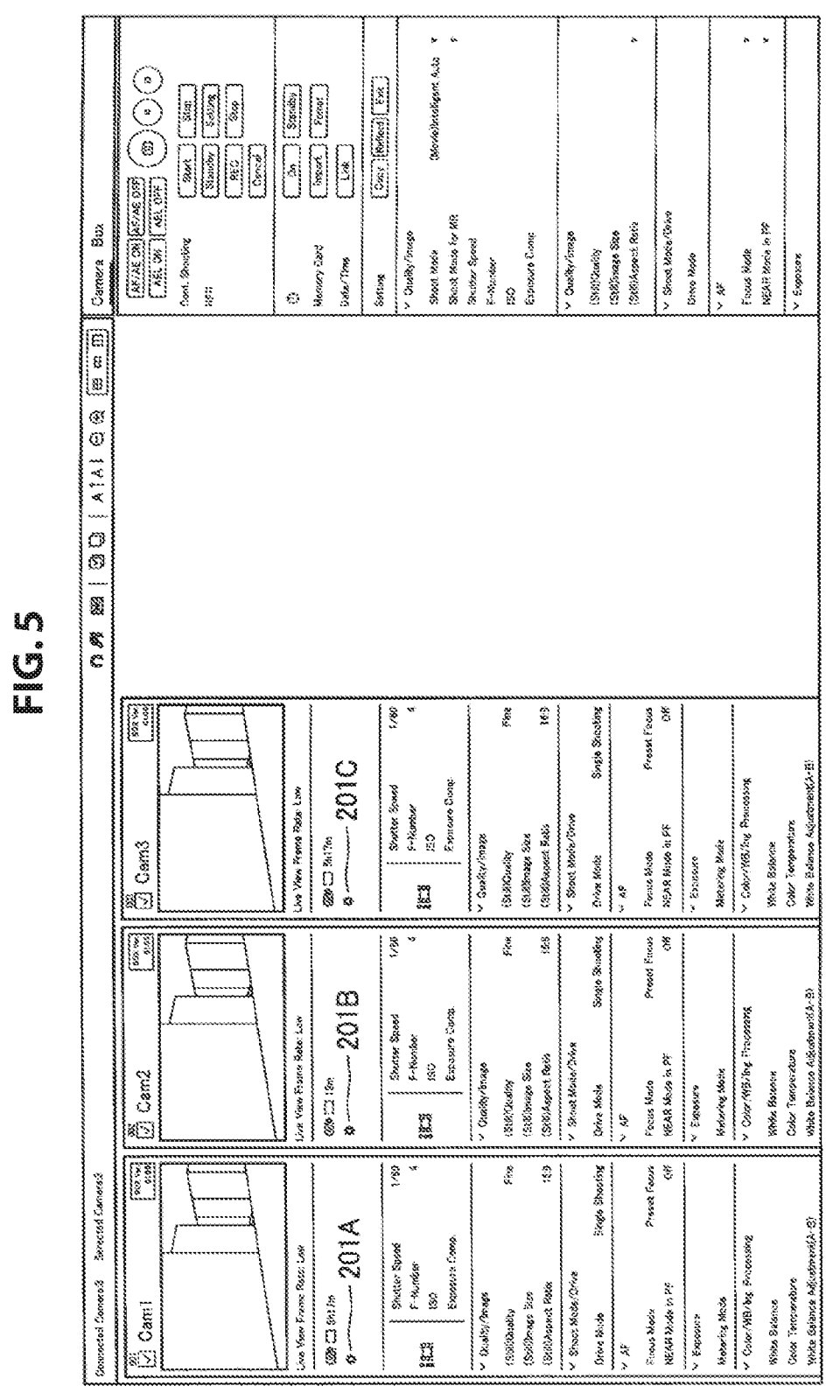
Figure 6:
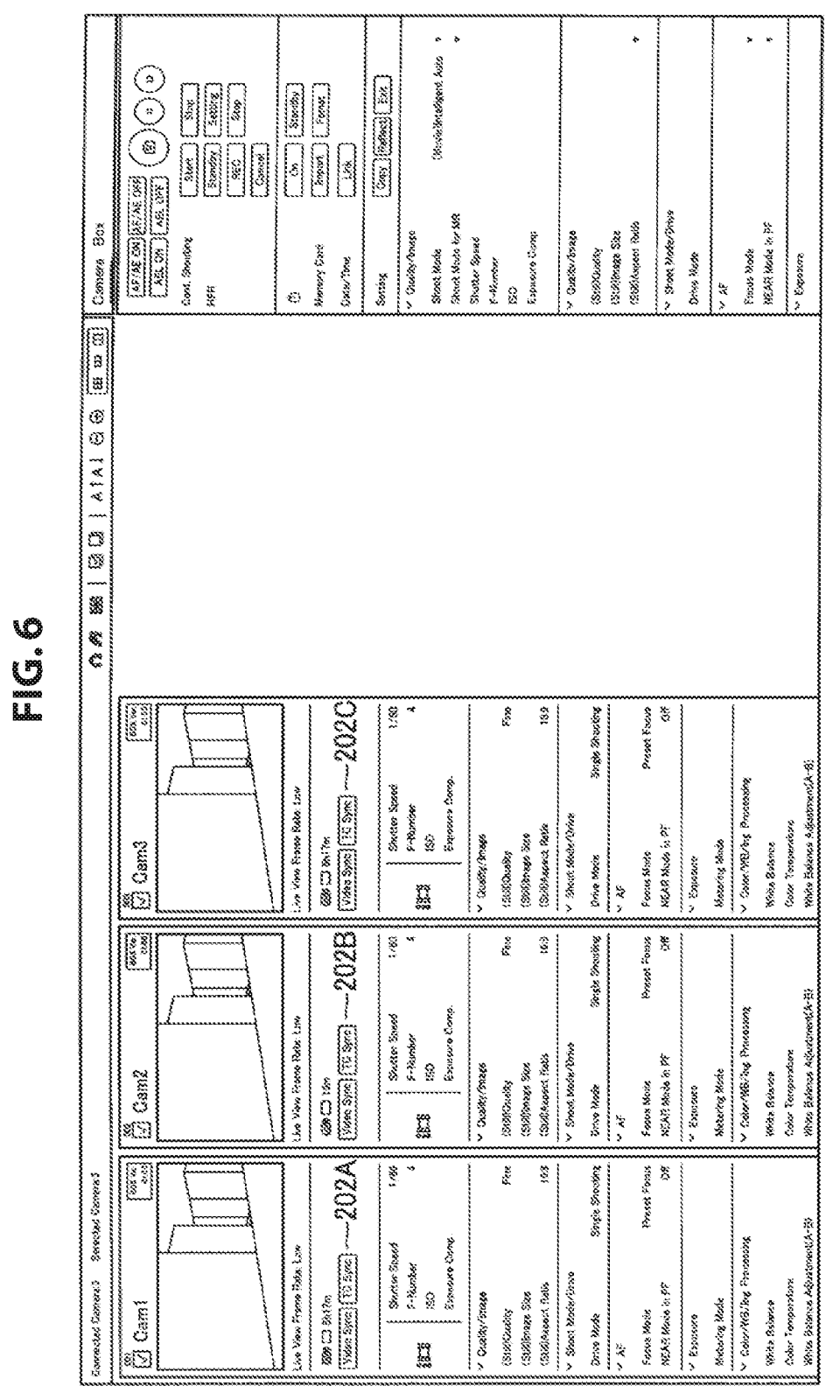

FIGS. 5 and 6 are explanatory diagrams each illustrating an example of a graphical user interface displayed on a screen of the external device 102. FIG. 5 is an explanatory diagram illustrating an example of a graphical user interface displayed on the screen of the external device 102 while the time synchronization process in the master camera control device and the client camera control device is being performed. FIG. 6 is an explanatory diagram illustrating an example of a graphical user interface displayed on the screen of the external device 102 after the time synchronization process in the master camera control device and the client camera control device is completed. In FIGS. 5 and 6, information of three camera control devices and cameras connected to the camera control devices is displayed. Information of the camera control devices and the cameras is acquired from the respective camera control devices connected to the external device 102 by Ethernet connection.

Examples of information of the cameras displayed on the external device 102 may include shutter speed, an f-number, image quality of captured images, an angle of view, autofocus settings, etc.

While the time synchronization process in the master camera control device and the client camera control device is being performed, icons 201A to 201C indicating that the time synchronization process is being performed are displayed on the screen of the external device 102.

Then, when the time synchronization process in the master camera control device and the client camera control device is completed, icons 202A to 202C indicating that time synchronization between the master camera control device and the client camera control device has been achieved are displayed on the screen of the external device 102.

By the graphical user interface thus being displayed on the screen of the external device 102, the progress of the time synchronization process in the master camera control device and the client camera control device can be checked.

(File Download Process)

Now, as an operation example of the multi-camera system 100 according to the embodiment of the present disclosure, an example of a file download process when images captured by a plurality of cameras 114 are saved in the external device 102 will be described.

FIGS. 7A to 7E are flowcharts illustrating an operation example of the multi-camera system 100 according to the embodiment of the present disclosure. FIGS. 7A to 7E illustrate an example of the file download process when images captured by the plurality of cameras 114 are saved in the external device 102. Hereinafter, the operation example of the multi-camera system 100 according to the embodiment of the present disclosure will be described using FIGS. 7A to 7E. The following description is given assuming that the master camera control device is the master camera control device 110A, and the client camera control device is the client camera control device 110B.

First, the power of each of the external device 102, the master camera control device 110A, and the client camera control device 110B is turned on (steps S201, S202, S203). After the power is turned on, the external device 102 then designates the IP address of the master camera control device 110A by using the Web browser, and accesses the Web server of the master camera control device 110A (step S204). At this point in time, the external device 102 performs normal display for displaying statuses of the cameras 114A and 114B on the Web browser.

Then, the external device 102 opens a file acquisition screen on the Web browser on the basis of user operation (step S205). This file acquisition screen is a screen for acquiring images captured by one or more cameras 114. An example of the file acquisition screen is described later.

After the power is turned on, the master camera control device 110A waits for an operation from a Web browser screen displayed on the external device 102 (step S206). When there is an operation from the Web browser screen and the operation is an operation for acquiring an image from a camera, the master camera control device 110A delivers an operation notification to the client camera control device 110B (step S207). On delivering the operation notification to the client camera control device 110B, the master camera control device 110A changes a mode of the connected camera 114A from a live view mode to a Media Transfer Protocol (MTP) mode (file transfer mode) (step S208). The live view mode is a mode in which images being captured by the camera 114A are output to the external device 102.

After the power is turned on, the client camera control device 110B waits for an operation notification from the master camera control device 110A (step S209). On receiving the operation notification from the master camera control device 110A, the client camera control device 110B changes a mode of the connected camera 114B from the live view mode to the MTP mode (file transfer mode) (step S210).

The external device 102 checks whether file lists have been acquired by the master camera control device 110A and the client camera control device 110B (step S211).

On changing the mode of the connected camera 114A to the MTP mode, the master camera control device 110A acquires a file list from the camera 114A concurrently with the process in step S211 (step S212). Similarly, on changing the mode of the connected camera 114B to the MTP mode, the client camera control device 110B acquires a file list from the camera 114B (step S213).

The external device 102 displays, on the Web browser, the respective file lists acquired by the master camera control device 110A and the client camera control device 110B (step S214). The user of the external device 102 selects images to be acquired from the file lists, and presses a button (Import button in the present embodiment) for acquiring the selected images from the cameras 114A and 114B (step S215).

When the Import button is pressed, the external device 102 acquires the selected images from the cameras 114A and 114B. At this time, the master camera control device 110A and the client camera control device 110B first acquire the images selected on the Web browser of the external device 102 from the cameras 114A and 114B, respectively (step S216). Note that the master camera control device 110A and the client camera control device 110B are collectively referred to and shown as "BOX" in the drawing. In addition, the external device 102 is shown as "PC" in the drawing. The external device 102 checks whether the master camera control device 110A and the client camera control device 110B are acquiring images respectively from the cameras 114A and 114B (step S217). If images are not being acquired, the external device 102 issues an image acquisition request to the master camera control device 110A (step S218).

After acquiring the file list from the camera 114A, the master camera control device 110A checks whether there is an image acquisition request from the external device 102 (step S219). If there is an image acquisition request from the external device 102, the master camera control device 110A delivers, to the client camera control device 110B, a notification indicating that an operation for image acquisition in the external device 102 has been performed (step S220).

Concurrently with the acquisition of images from the cameras 114A and 114B by the master camera control device 110A and the client camera control device 110B, the external device 102 performs download of images from the master camera control device 110A and the client camera control device 110B (BOX) (step S222). The external device 102 checks a situation of download from the master camera control device 110A and the client camera control device 110B (step S223). If there is no image being downloaded, the external device 102 then checks a situation of the acquisition of images from the cameras 114A and 114B by the master camera control device 110A and the client camera control device 110B (step S224).

Concurrently with the process in step S224, the master camera control device 110A and the client camera control device 110B acquires the images designated from the external device 102 from the cameras 114A and 114B, respectively (steps S225, S226).

The external device 102 downloads the images designated in the step S215 from the master camera control device 110A and the client camera control device 110B (step S227). That is, the external device 102 downloads the images acquired from the cameras 114A and 114B respectively by the master camera control device 110A and the client camera control device 110B in steps S225 and S226 from the master camera control device 110A and the client camera control device 110B.

When downloading images from the master camera control device 110A and the client camera control device 110B, the external device 102 sets file names in a manner that the file names do not overlap and performs download. For example, when downloading images from the master camera control device 110A and the client camera control device 110B, the external device 102 adds names for uniquely identifying the cameras 114A and 114B to the file names. The name may be added at, for example, the beginning of the file name. For example, if a name of "Cam1" is set for the camera 114A, the external device 102 saves an image captured by the camera 114A with a file name like "Cam1_000001.JPG". In addition, for example, if a name of "Cam2" is set for the camera 114B, the external device 102 saves an image captured by the camera 114B with a file name like "Cam2_000001.JPG". By thus adding names for uniquely identifying the cameras 114A and 114B to the file names when downloading images, it is possible to avoid overlap of file names at the time of saving in the external device 102 even in the case where images saved with the same file name exist in the cameras 114A and 114B.

Needless to say, information that the external device 102 adds to the file names when downloading images from the master camera control device 110A and the client camera control device 110B is not limited to names for uniquely identifying the cameras. For example, the external device 102 may add part or the whole of an IP address of a camera control device connected to the camera to a file name of a file downloaded from the camera control device. In addition, for example, the external device 102 may add part or the whole of a MAC address of the camera to a file name of a file downloaded from the camera control device.

When download of the images is completed and the user of the external device 102 closes the file acquisition screen displayed on the Web browser (step S228), a user operation notification indicating that the file acquisition screen has been closed is sent from the external device 102 to the master camera control device 110A. The master camera control device 110A waits for a notification of a file acquisition screen closing operation (step S229).

On receiving the notification of the file acquisition screen closing operation, the master camera control device 110A delivers an operation notification to the client camera control device 110B (step S230). Then, the master camera control device 110A cancels the MTP mode of the connected camera 114A (step S231). Similarly, the master camera control device 110B cancels the MTP mode of the connected camera 114B (step S232). When the MTP mode of the cameras 114A and 114B is cancelled, the mode of the cameras 114A and 114B returns to the live view mode.

When the file acquisition screen displayed on the Web browser is closed by user operation, the external device 102 checks whether the MTP mode of the cameras 114A and 114B is cancelled (step S233). When the MTP mode of the cameras 114A and 114B is cancelled, the external device 102 performs normal display for displaying statuses of the cameras 114A and 114B on the Web browser (step S234).

The external device 102 according to the embodiment of the present disclosure can acquire images captured by the cameras 114A and 114B respectively from the master camera control device 110A and the client camera control device 110B by performing the series of operations described above.

Figure 8:
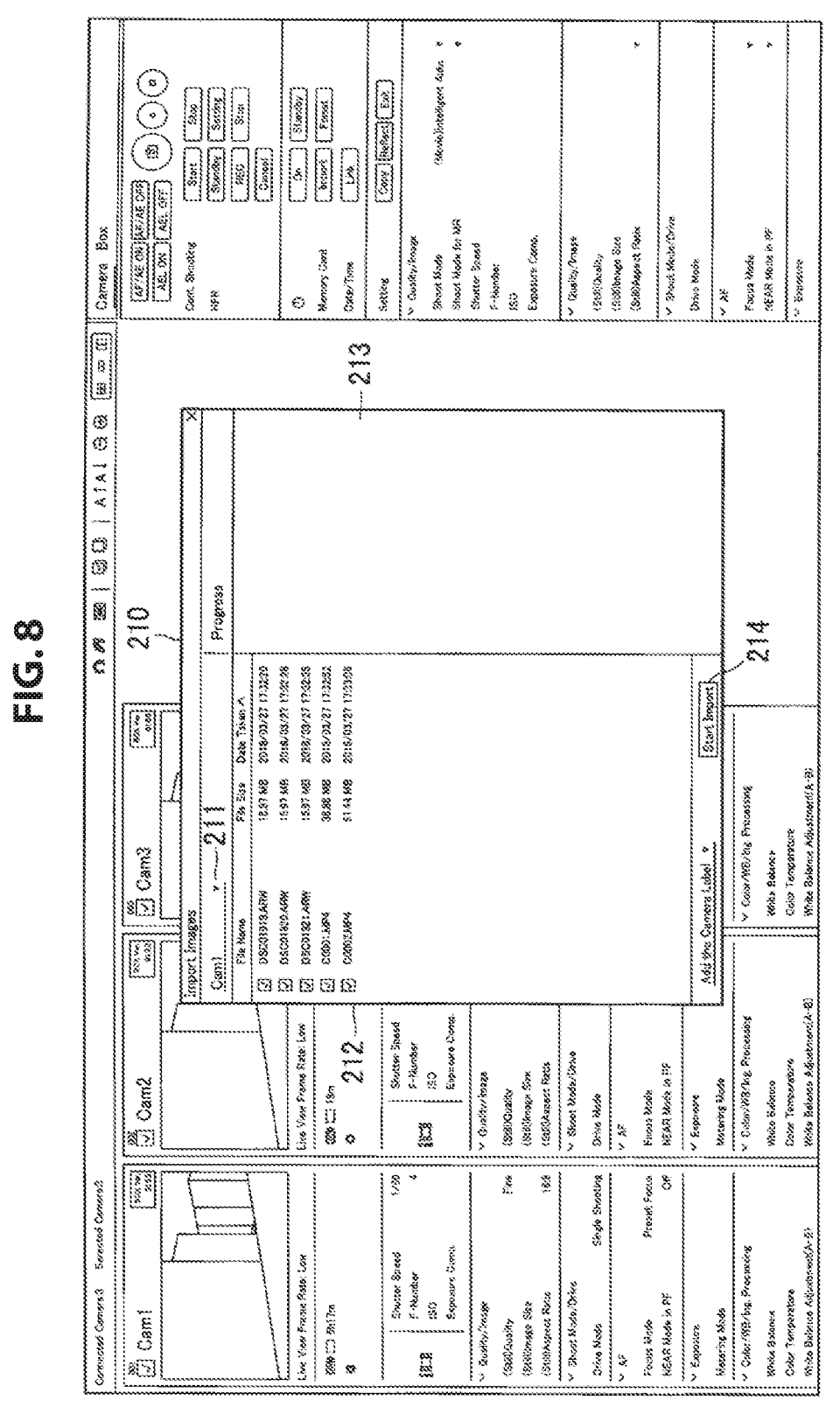

FIGS. 8 to 12 are explanatory diagrams each illustrating an example of a graphical user interface displayed on a screen of the external device 102. FIG. 8 is an example of a user interface for importing images from the cameras 114. FIG. 8 shows a window 210 for importing images, a pull-down menu 211 for selecting the target camera 114, a file list display area 212 in which a file list is displayed, a progress display area 213 in which the progress of download of images from the camera control devices 110 is displayed, and an Import button 214 for performing import of images. A file list is displayed in the file list display area 212 by the process of step S214 described above.

Figure 9:
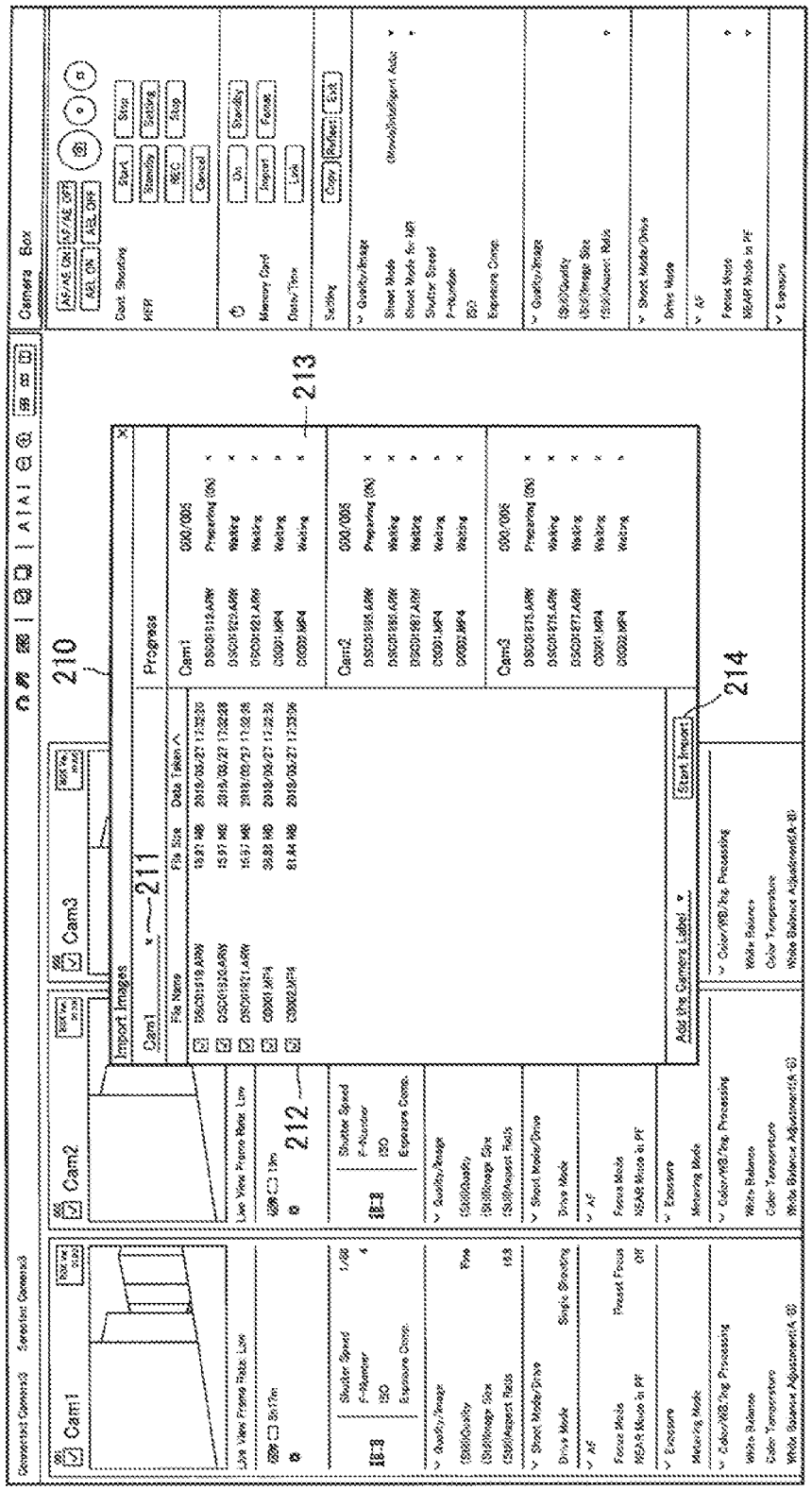
FIG. 9 is an explanatory diagram illustrating an example of a graphical user interface displayed on a screen of an external device.

FIG. 9 is an example of a graphical user interface displayed after the user selects images to be imported and the user presses the Import button 214. When the user presses the Import button 214, the external device 102 performs download of images from the camera control devices 110. The progress of download of images from the camera control devices 110 is displayed in the progress display area 213.

Figure 10:
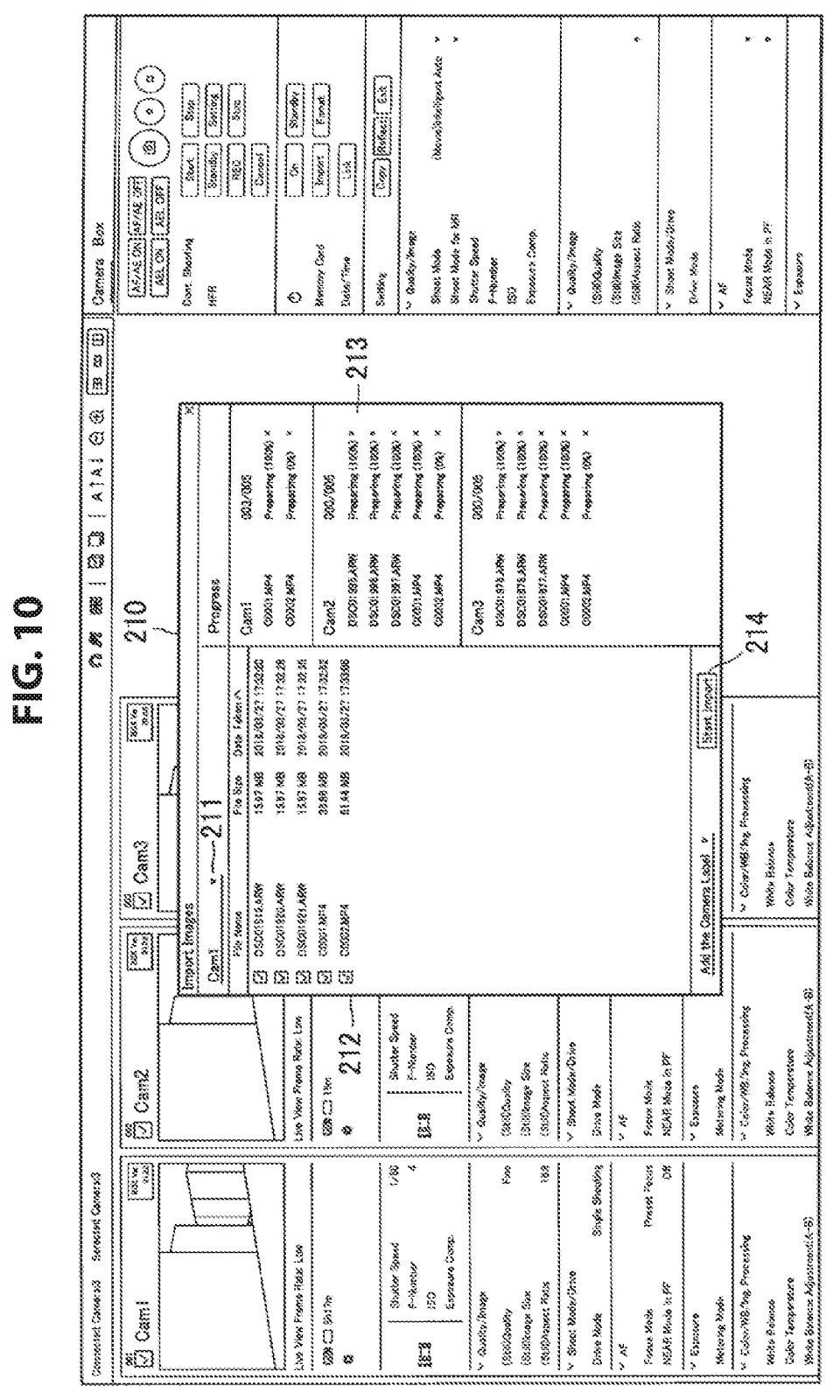
Figure 11:
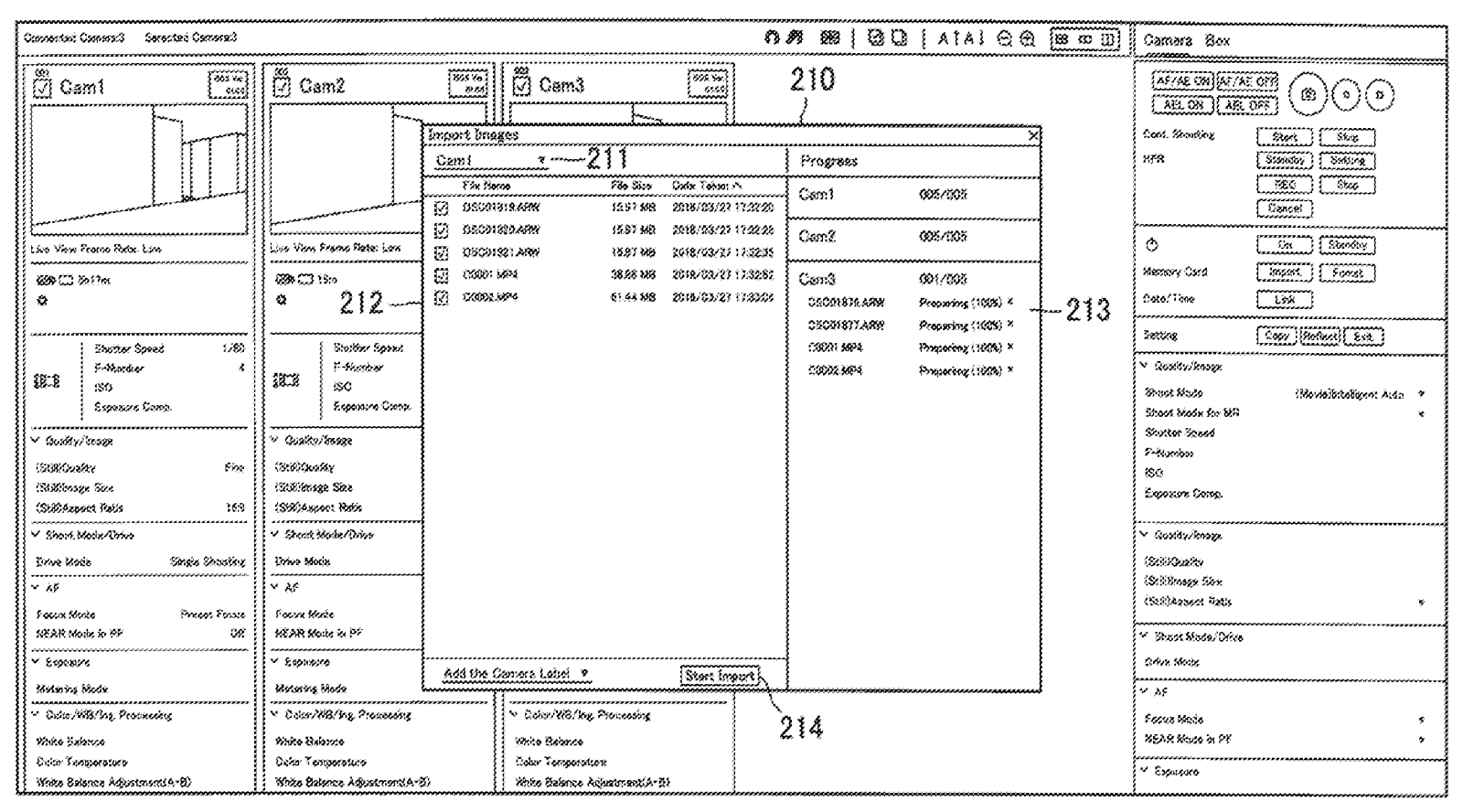
Figure 12:
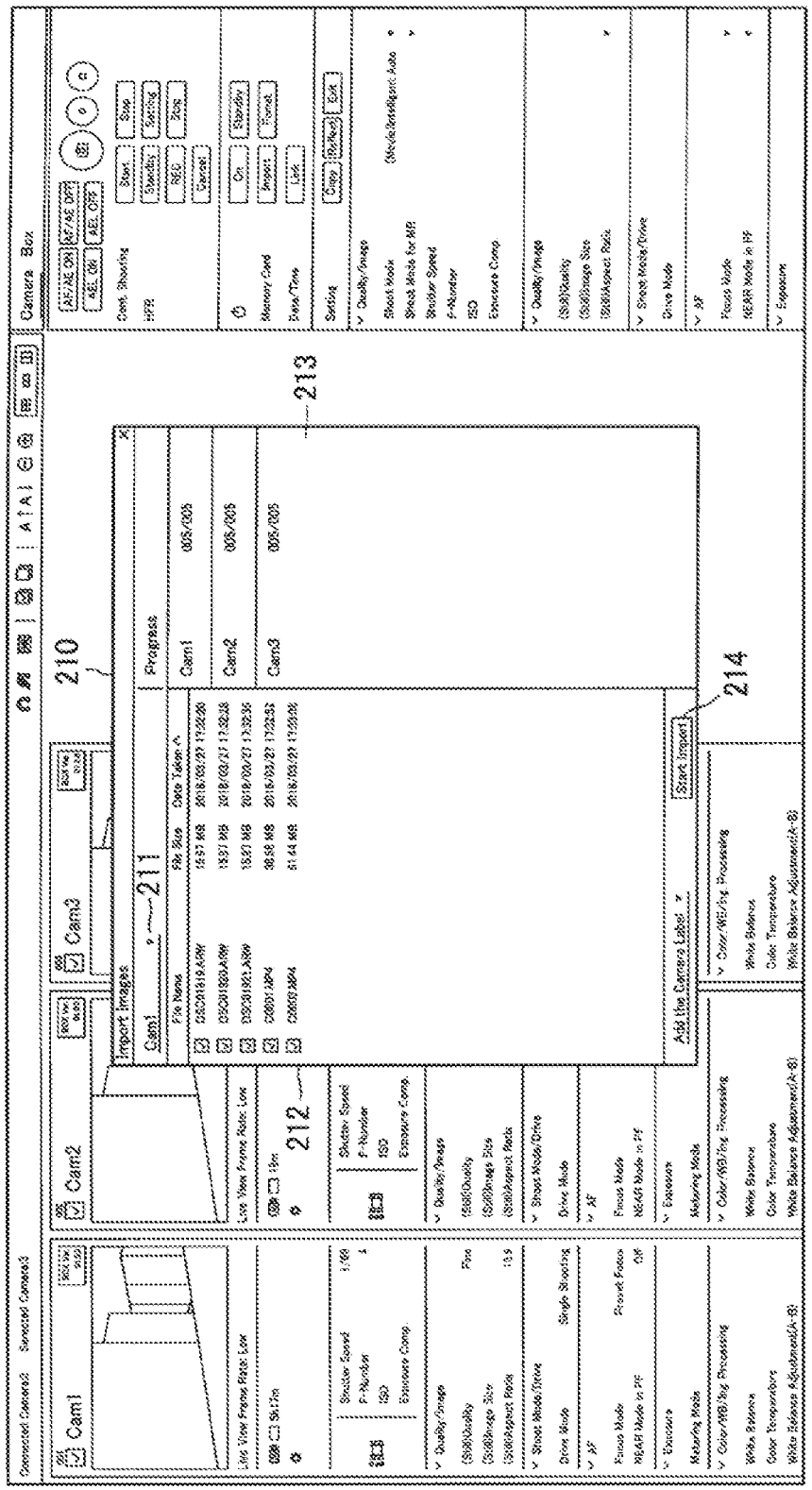
FIG. 12 is an explanatory diagram illustrating an example of a graphical user interface displayed on a screen of an external device.

A file name of a file whose download has been completed is deleted from the progress display area 213 as illustrated in FIGS. 10 and 11. When download of all the files is completed, all the file names are deleted from the progress display area 213 as illustrated in FIG. 12.

2. Conclusion

According to the embodiment of the present disclosure as described above, in a multi-camera system including a plurality of camera control devices and a plurality of cameras communicatively connected to an external device (for example, a personal computer) via the plurality of camera control devices, time can be synchronized with high precision between the plurality of camera control devices and the plurality of cameras.

In addition, according to the embodiment of the present disclosure, in a multi-camera system including a plurality of camera control devices and a plurality of cameras communicatively connected to an external device via the plurality of camera control devices, images captured by the cameras can be saved in the external device in a collective manner efficiently, for example, without causing overlap of file names.

It should be understood by those skilled in the art that various modifications, combinations, sub-combinations and alterations may occur depending on design requirements and other factors insofar as they are within the scope of the appended claims or the equivalents thereof.

Further, the effects described in this specification are merely illustrative or exemplified effects, and are not limitative. That is, with or in the place of the above effects, the technology according to the present disclosure may achieve other effects that are clear to those skilled in the art from the description of this specification.

What is claimed is:

1. A master control device comprising:
a communication interface including a first communication interface and a second communication interface that is different from the first communication interface, the first communication interface is configured to interface and establish communication with a plurality of client control devices and an information processing device via a first communication link, and the second communication interface configured to interface and establish communication with a first imaging device via a second communication link,
each client control device of the plurality of client control devices is configured to control one of a plurality of imaging devices, the plurality of imaging devices excluding the first imaging device; and
an electronic processor communicatively connected to the communication interface with an internal communication bus, the electronic processor configured to
receive an initial communication from the information processing device via the communication interface,
synchronize time with the information processing device via the communication interface in response to receiving the initial communication, and
control the plurality of client control devices to perform time synchronization via the communication interface based on the time that is synchronized between the master control device and the information processing device in response to synchronizing the time between the master control device and the information processing device,
wherein the first communication link and the second communication link are separate and distinct from the internal communication bus of the master control device.

2. The master control device according to claim 1, wherein the each client control device of the plurality of client control devices is configured to perform frame and time synchronization with respective ones of the plurality of imaging devices in response to the time synchronization between the master control device and the plurality of client control devices.

3. The master control device according to claim 1, wherein the master control device is further configured to
receive a selection of an image by the information processing device based on a list of images,
acquire the image that is selected from one of the plurality of imaging devices, and
transmit the image that is acquired to the information processing device.

4. A data transmission method, the method comprising:
receiving, with a master control device and a communication interface, an initial communication from an information processing device, the communication interface including a first communication interface establishing communication with the information processing device and a plurality of client control devices via a first communication link;
synchronizing, with the master control device and the communication interface, time with the information processing device in response to receiving the initial communication via the first communication link; and
controlling, with the master control device and the first communication interface, the plurality of client control devices to perform time synchronization based on the time that is synchronized between the master control device and the information processing device via the first communication link in response to synchronizing the time between the master control device and the information processing device,
wherein the communication interface further includes a second communication interface that is different from the first communication interface, the second communication interface establishing communication with an imaging device via a second communication link that is different from the first communication link.

5. The data transmission method according to claim 4, wherein the each client control device of the plurality of client control devices is configured to perform frame and time synchronization with respective ones of a plurality of imaging devices in response to the time synchronization between the master control device and the plurality of client control devices.

6. The data transmission method according to claim 4, further comprising:
receiving a selection of an image by the information processing device based on a list of images;
acquiring the image that is selected from one of a plurality of imaging devices; and
transmitting the image that is acquired to the information processing device.

7. A non-transitory computer-readable medium comprising instructions that, when executed by an electronic processor, cause the electronic processor to perform a set of operations comprising:
controlling a first communication interface of a communication interface to establish communication with an information processing device via a first communication link;
controlling the first communication interface to receive an initial communication from the information processing device;
controlling the first communication interface to synchronize time with the information processing device in response to receiving the initial communication; and
controlling the first communication interface to establish communication with a plurality of client control devices and perform time synchronization based on the time that is synchronized between a master control device and the information processing device in response to synchronizing the time between the master control device and the information processing device,
wherein the communication interface further includes a second communication interface that is different from the first communication interface, the second communication interface establishing communication with an imaging device via a second communication link that is different from the first communication link.

8. The non-transitory computer-readable medium according to claim 7, wherein the each client control device of the plurality of client control devices is configured to perform frame and time synchronization with respective ones of a plurality of imaging devices in response to the time synchronization between the master control device and the plurality of client control devices.

9. The non-transitory computer-readable medium according to claim 7, wherein the set of operations further includes
receiving a selection of an image by the information processing device based on a list of images;
acquiring the image that is selected from one of a plurality of imaging devices; and
transmitting the image that is acquired to the information processing device.

10. A client control device comprising:
a communication interface including a first communication interface and a second communication interface that is different from the first communication interface, the first communication interface is configured to interface and establish communication with a master control device via a first communication link, and the second communication interface is configured to interface and establish communication with one of a plurality of imaging devices via a second communication link; and
an electronic processor communicatively connected to the communication interface via an internal communication bus, the electronic processor configured to
perform time synchronization with the master control device via the communication interface based on a time that is synchronized between the master control device and an information processing device, and
perform frame and time synchronization with the one of the plurality of imaging devices in response to the time synchronization with the master control device,
wherein the first communication link and the second communication link are separate and distinct from the internal communication bus of the client control device.

11. The client control device according to claim 10, wherein the master control device is further configured to
receive a selection of an image by the information processing device based on a list of images,
acquire the image that is selected from the one of the plurality of imaging devices, and
output the image that is acquired.

12. A data transmission method, the method comprising:
performing, with a client control device and a communication interface, time synchronization with a master control device based on a time that is synchronized between the master control device and an information processing device, the communication interface including a first communication interface establishing communication with the master control device via a first communication link; and
performing, with the client control device and the communication interface, frame and time synchronization with one of a plurality of imaging devices in response to the time synchronization with the master control device, the communication interface including a second communication interface establishing communication with the one of the plurality of imaging devices via a second communication link that is different from the first communication link,
wherein the second communication interface is different from the first communication interface.

13. The data transmission method according to claim 12, further comprising:
receiving a selection of an image by the information processing device based on a list of images;
acquiring the image that is selected from the one of the plurality of imaging devices; and
outputting the image that is acquired.

14. A non-transitory computer-readable medium comprising instructions that, when executed by an electronic processor, cause the electronic processor to perform a set of operations comprising:
controlling a first communication interface of a communication interface to establish communication with a master control device via a first communication link;
controlling the first communication interface to communicate with the master control device to perform time synchronization with the master control device based on a time that is synchronized between the master control device and an information processing device;
controlling a second communication interface to establish communication with one of a plurality of imaging devices via a second communication link that is different from the first communication link; and
controlling the second communication interface to communicate with the one of the plurality of imaging devices to perform frame and time synchronization with the one of the plurality of imaging devices in response to the time synchronization with the master control device.

15. The non-transitory computer-readable medium according to claim 14, further comprising:
receiving a selection of an image by the information processing device based on a list of images;
acquiring the image that is selected from the one of the plurality of imaging devices; and
outputting the image that is acquired.

16. The client control device according to claim 10, wherein the first communication link and the second communication link are each a wired communication link, wherein the communication interface is further configured to receive a first end of the first communication link and a first end of the second communication link.

17. The client control device according to claim 16, wherein the first end of the first communication link is an end of an ethernet cable, and wherein the first end of the second communication link is an end of a Universal Serial Bus (USB) cable.

18. The master control device according to claim 1, wherein the first communication link and the second communication link are each a wired communication link, wherein the communication interface is further configured to receive a first end of the first communication link and a first end of the second communication link.

19. The master control device according to claim 18, wherein the first end of the first communication link is an end of an ethernet cable, and wherein the first end of the second communication link is an end of a Universal Serial Bus (USB) cable.

* * * * *